US012386176B2

(12) United States Patent
Ashwood et al.

(10) Patent No.: US 12,386,176 B2
(45) Date of Patent: Aug. 12, 2025

(54) THERMAL ARCHITECTURE FOR SMART GLASSES

(71) Applicant: Snap Inc., Santa Monica, CA (US)

(72) Inventors: Andrea Ashwood, Culver City, CA (US); Gerald Nilles, Culver City, CA (US); Patrick Timothy Mcsweeney Simons, Redondo Beach, CA (US); Stephen Andrew Steger, Los Angeles, CA (US); Choonshin You, Irvine, CA (US)

(73) Assignee: Snap, Inc., Santa Monica, CA (US)

( * ) Notice: Subject to any disclaimer, the term of this patent is extended or adjusted under 35 U.S.C. 154(b) by 490 days.

(21) Appl. No.: 17/737,241

(22) Filed: May 5, 2022

(65) Prior Publication Data
US 2022/0357577 A1 Nov. 10, 2022

Related U.S. Application Data

(60) Provisional application No. 63/184,879, filed on May 6, 2021.

(51) Int. Cl.
G02B 27/01 (2006.01)
(52) U.S. Cl.
CPC ...... *G02B 27/017* (2013.01); *G02B 2027/014* (2013.01); *G02B 2027/0178* (2013.01)
(58) Field of Classification Search
CPC ............ G02B 27/017; G02B 2027/014; G02B 2027/0178

(Continued)

(56) References Cited

U.S. PATENT DOCUMENTS 9,423,842 B2 8/2016 Osterhout et al.
9,733,680 B1 8/2017 Voth et al.
(Continued)

FOREIGN PATENT DOCUMENTS

CN 110879475 A 3/2020
CN 110908116 A 3/2020
(Continued)

OTHER PUBLICATIONS

International Search Report and Written Opinion for International Application No. PCT/US2022/025597, dated Aug. 10, 2022 (Oct. 8, 2022)—10 pages.

(Continued)

Primary Examiner — Jerry L Brooks
(74) Attorney, Agent, or Firm — CM Law; Stephen J. Weed

(57) ABSTRACT

A method of dissipating heat generated by imaging devices and processing devices of a wearable electronic eyewear device includes providing a first heat sink thermally connecting the imaging devices to a frame of the eyewear device to sink heat to the frame and providing a second heat sink thermally connecting the processing devices to respective temples of the eyewear device to sink heat to the respective temples. The first and second heat sinks are thermally insulated from each other to direct the heat to different portions of the eyewear device. The processing devices may include a first co-processor disposed in a first temple connected to a first end of the frame and a second co-processor disposed in a second temple connected to a second end of the frame. The resulting eyewear device spreads the heat from heat generating devices over a larger area to minimize overall heating.

19 Claims, 32 Drawing Sheets

(58) Field of Classification Search
USPC .......................................................... 359/630
See application file for complete search history.

(56) References Cited

U.S. PATENT DOCUMENTS

| | | |
|---|---|---|
| 9,851,585 B2 | 12/2017 | Ashwood |
| 10,108,017 B2 | 10/2018 | Nikkhoo et al. |
| 10,527,355 B2 | 1/2020 | Hurbi et al. |
| 11,921,289 B2 | 3/2024 | Travers et al. |
| 2007/0177239 A1 | 8/2007 | Tanijiri et al. |
| 2011/0221659 A1 | 9/2011 | King, III et al. |
| 2016/0116745 A1 | 4/2016 | Osterhout et al. |
| 2016/0212886 A1 | 7/2016 | Nikkhoo |
| 2017/0097509 A1 | 4/2017 | Yoshida |
| 2017/0237935 A1 | 8/2017 | Totani et al. |
| 2018/0024368 A1 | 1/2018 | Takagi et al. |
| 2018/0052501 A1* | 2/2018 | Jones, Jr. ........... H05K 7/20963 |
| 2020/0310118 A1 | 10/2020 | Kamakura |
| 2020/0310132 A1 | 10/2020 | Takagi et al. |
| 2020/0310138 A1 | 10/2020 | Kamakura |
| 2020/0310139 A1 | 10/2020 | Takagi et al. |
| 2020/0310140 A1 | 10/2020 | Kamakura |
| 2021/0068316 A1 | 3/2021 | Kamakura |
| 2021/0103146 A1 | 4/2021 | Travers et al. |

FOREIGN PATENT DOCUMENTS

| | | |
|---|---|---|
| CN | 111025652 A | 4/2020 |
| CN | 112394518 A | 2/2021 |
| KR | 1020190010345 A | 1/2019 |

OTHER PUBLICATIONS

International Search Report and Written Opinion for International Application No. PCT/US2022/027795, dated Aug. 23, 2022 (Aug. 23, 2022)—13 pages.
U.S. Appl. No. 17/725,245, filed Apr. 20, 2022 to Ashwood et al.
Extended European Search Report for EP 22799565.1 (4335263) mailed Mar. 7, 2025 (Jul. 3, 2025), 10 pages.

* cited by examiner

A)

B)

THERMAL ARCHITECTURE FOR SMART GLASSES

CROSS-REFERENCE TO RELATED APPLICATIONS

This application claims priority to U.S. Provisional Application Ser. No. 63/184,879 filed on May 6, 2021, the contents of which are incorporated fully herein by reference.

TECHNICAL FIELD

Examples set forth in the present disclosure relate to portable electronic devices, including wearable electronic devices such as smart glasses. More particularly, but not by way of limitation, the present disclosure describes a wearable electronic eyewear device designed to optimally manage excess heat generated by electronic components.

BACKGROUND

Many electronic devices available today include wearable consumer electronic devices. Wearable consumer electronic devices may generate excess heat due to processors and other heat generating electronics. The generation of such excess heat may meaningfully constrain the power consumption of the wearable consumer electronic devices. High power displays and complex algorithms running on powerful processors are difficult to keep cool within the volume of a wearable form factor. For example, smart glasses that provide augmented reality experiences including six degrees of freedom processing may be thermally limited and necessitate throttling to ensure that safe operating temperatures are not exceeded.

BRIEF DESCRIPTION OF THE DRAWINGS

Features of the various implementations disclosed will be readily understood from the following detailed description, in which reference is made to the appending drawing figures. A reference numeral is used with each element in the description and throughout the several views of the drawing. When a plurality of similar elements is present, a single reference numeral may be assigned to like elements, with an added lower-case letter referring to a specific element.

The various elements shown in the figures are not drawn to scale unless otherwise indicated. The dimensions of the various elements may be enlarged or reduced in the interest of clarity. The several figures depict one or more implementations and are presented by way of example only and should not be construed as limiting. Included in the drawing are the following figures.

DETAILED DESCRIPTION

Figure 1A:
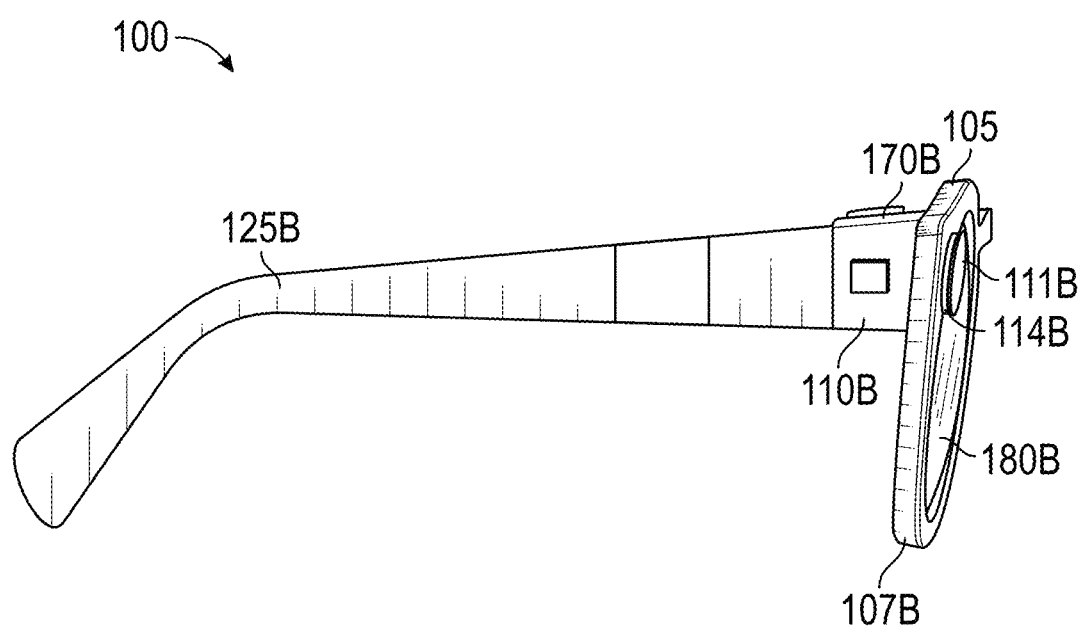
FIG. 1A illustrates a side view of an example hardware configuration of a wearable electronic eyewear device showing a right optical assembly with an image display.

Wearable electronic devices available today generate excessive heat that may impair device function. A wearable electronic eyewear device that includes a thermal management device is described herein. The wearable electronic eyewear device includes a body that holds one or more optical elements. It also includes onboard electronic components and one or more heat sources that radiate heat during operation of the components. The wearable electronic eyewear device also includes a heat sink at another area of the body and a thermal coupling disposed within the eyewear body that is thermally coupled to the heat source and the heat sink to increase heat dissipation of the electronic components.

A wearable electronic eyewear device designed to enable an immersive augmented reality experience may use more immersive, larger field of view displays that require significantly more projector and rendering power. It is desired to provide wearable electronic eyewear devices that may handle the heat generated during such experiences without thermal throttling. To address this challenge, the wearable electronic eyewear devices described herein are configured to decouple the heat generated by a projector designed to disperse power from light emitting diodes (LEDs) from the heat generated by processing chips that implement a vapor chamber to more evenly distribute the heat from the processing chips. The configuration includes separating the projector thermal management devices from the processing chip thermal management devices by, for example, an air gap, and guiding the heat generated by the projector(s) to the frame and the heat generated by the processing circuit(s) to the temples of the wearable electronic eyewear device. Also, the processing chips may be implemented by co-processors disposed on respective temples of the wearable electronic eyewear device to further distribute the generated heat.

This disclosure is directed to a method of dissipating heat generated by imaging devices and processing devices of a wearable electronic eyewear device. The method includes providing a first heat sink thermally connecting the imaging devices to a frame of the eyewear device to sink heat to the frame and providing a second heat sink thermally connecting the processing devices to respective temples of the eyewear device to sink heat to the respective temples. The first and second heat sinks are thermally insulated from each other to direct the heat to different portions of the eyewear device. The processing devices may include a first co-processor disposed in a first temple connected to a first end of the frame and a second co-processor disposed in a second temple connected to a second end of the frame. The resulting wearable electronic eyewear device may include a frame, at least one temple connected to the frame, at least one image display, at least one imaging device adapted to capture an image of a scene and to project the image to the at least one image display, at least one processing device, and a thermal management device. The thermal management device may include a first heat sink thermally connected to the at least one imaging device and to the frame to sink heat from the at least one imaging device to the frame, a second heat sink thermally connected to the at least one processing device and the at least one temple to sink heat from the at least one processing device to the at least one temple, and a thermally insulating gap, such as an air gap, between the first heat sink and the second heat sink. The resulting wearable electronic eyewear device spreads the heat from heat generating devices over a larger area to minimize overall heating.

As used herein, the term "thermal envelope" is used to describe the amount of heat that can be dissipated in a wearable electronic eyewear device in a steady state before hitting a temperature limit. The temperature limits may generally fall into two categories: component limits and touch limits. The component limits are generally dictated by the manufacturer and are designed to ensure functionality and a desired lifetime of the electronic component. However, there are instances where the component limit may be set lower than the manufacturer's specification to ensure a minimum performance. On the other hand, touch temperature limits are dependent upon material composition and whether that material is in constant physical contact with a user. Table 1 below shows touch temperature limits set by user studies and the International Electrotechnical Commission (IEC) Guide 117 for various materials. Extended duration skin contact is set by the IEC guidelines and assumes a wear duration of greater than 10 minutes.

TABLE 1

Touch Temperature Limits

| Material | Temperature Limit (° C.) | Temperature Limit for extended duration skin contact (° C.) |
| --- | --- | --- |
| Plastic | 55 | 43 |
| Exposed metal | 43 | 43 |
| Fabric | 55 | 43 |

The following detailed description includes systems, methods, techniques, instruction sequences, and computer program products illustrative of examples set forth in the disclosure. Numerous details and examples are included for the purpose of providing a thorough understanding of the disclosed subject matter and its relevant teachings. Those skilled in the relevant art, however, may understand how to apply the relevant teachings without such details. Aspects of the disclosed subject matter are not limited to the specific devices, systems, and methods described because the relevant teachings can be applied or practiced in a variety of ways. The terminology and nomenclature used herein is for the purpose of describing particular aspects only and is not intended to be limiting. In general, well-known instruction instances, protocols, structures, and techniques are not necessarily shown in detail.

The term "connect," "connected," "couple," and "coupled" as used herein refers to any logical, optical, physical, or electrical connection, including a link or the like by which the electrical or magnetic signals produced or supplied by one system element are imparted to another coupled or connected system element. Unless described otherwise, coupled, or connected elements or devices are not necessarily directly connected to one another and may be separated by intermediate components, elements, or communication media, one or more of which may modify, manipulate, or carry the electrical signals. The term "on" means directly supported by an element or indirectly supported by the element through another element integrated into or supported by the element.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

The orientations of the eyewear device, associated components and any complete devices incorporating an eye scanner and camera such as shown in any of the drawings, are given by way of example only, for illustration and discussion purposes. In operation for a particular variable optical processing application, the eyewear device may be oriented in any other direction suitable to the particular application of the eyewear device, for example up, down, sideways, or any other orientation. Also, to the extent used herein, any directional term, such as front, rear, inwards, outwards, towards, left, right, lateral, longitudinal, up, down, upper, lower, top, bottom and side, are used by way of example only, and are not limiting as to direction or orientation of any optic or component of an optic constructed as otherwise described herein.

Reference now is made in detail to the examples illustrated in the accompanying drawings and discussed below.

Figure 2A:
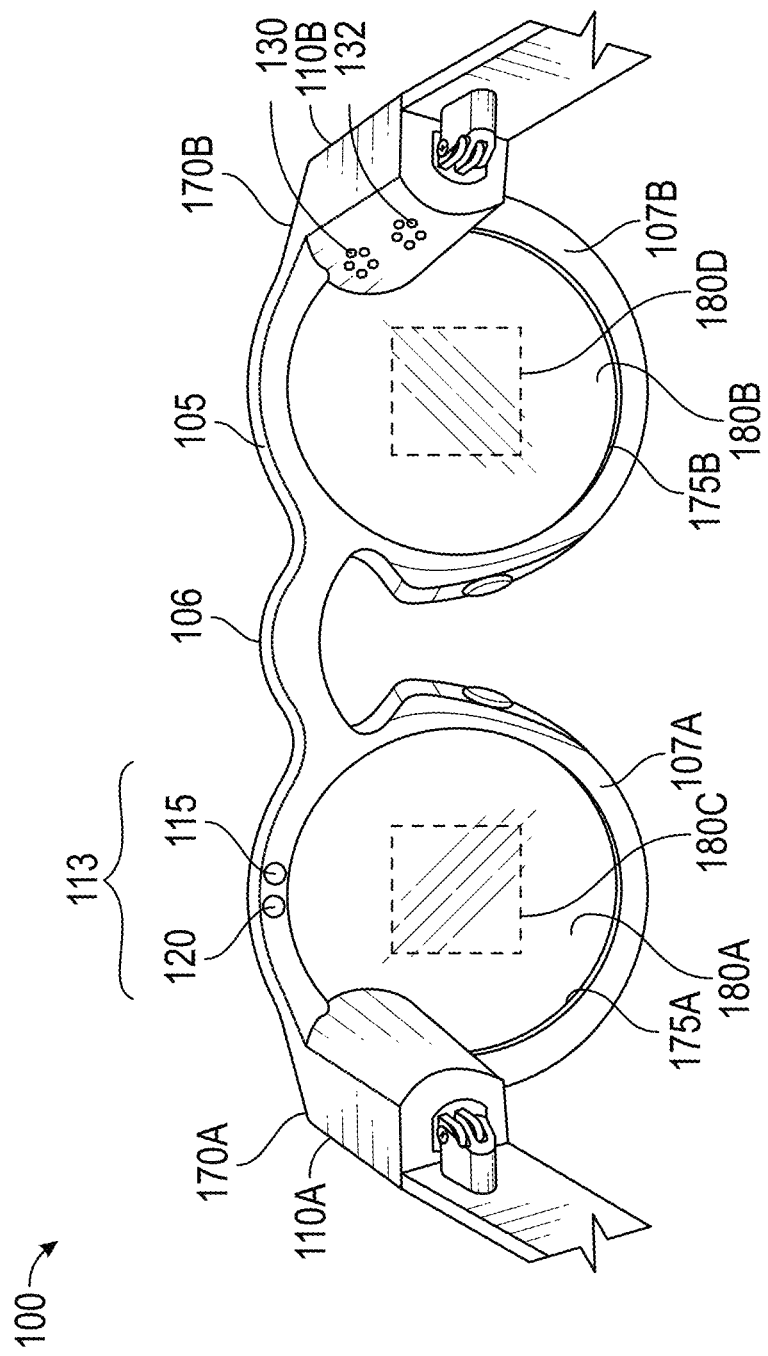
FIG. 2A illustrates a rear view of an example hardware configuration of a wearable electronic eyewear device in an example hardware configuration.

FIG. 1A illustrates a side view of an example hardware configuration of a wearable electronic eyewear device 100 including a right optical assembly 180B with an image display 180D (FIG. 2A). Wearable electronic eyewear device 100 includes multiple visible light cameras 114A-B (FIG. 7) that form a stereo camera, of which the right visible light camera 114B is located on a right temple 110B and the left visible light camera 114A is located on a left temple 110A.

The left and right visible light cameras 114A-B may include an image sensor that is sensitive to the visible light range wavelength. Each of the visible light cameras 114A-B has a different frontward facing angle of coverage, for example, visible light camera 114B has the depicted angle of coverage 111B. The angle of coverage is an angle range in which the image sensor of the visible light camera 114A-B picks up electromagnetic radiation and generates images. Examples of such visible lights camera 114A-B include a high-resolution complementary metal-oxide-semiconductor (CMOS) image sensor and a video graphic array (VGA) camera, such as 640p (e.g., 640×480 pixels for a total of 0.3 megapixels), 720p, or 1080p. Image sensor data from the visible light cameras 114A-B may be captured along with geolocation data, digitized by an image processor, and stored in a memory.

To provide stereoscopic vision, visible light cameras 114A-B may be coupled to an image processor (element 912 of FIG. 9) for digital processing along with a timestamp in which the image of the scene is captured. Image processor 912 may include circuitry to receive signals from the visible light camera 114A-B and to process those signals from the visible light cameras 114A-B into a format suitable for storage in the memory (element 934 of FIG. 9). The timestamp may be added by the image processor 912 or other processor that controls operation of the visible light cameras 114A-B. Visible light cameras 114A-B allow the stereo camera to simulate human binocular vision. Stereo cameras also provide the ability to reproduce three-dimensional images (image 715 of FIG. 7) based on two captured images (elements 758A-B of FIG. 7) from the visible light cameras 114A-B, respectively, having the same timestamp. Such three-dimensional images 715 allow for an immersive lifelike experience, e.g., for virtual reality or video gaming. For stereoscopic vision, the pair of images 758A-B may be generated at a given moment in time—one image for each of the left and right visible light cameras 114A-B. When the pair of generated images 758A-B from the frontward facing field of view (FOV) 111A-B of the left and right visible light cameras 114A-B are stitched together (e.g., by the image processor 912), depth perception is provided by the optical assembly 180A-B.

In an example, the wearable electronic eyewear device 100 includes a frame 105, a right rim 107B, a right temple 110B extending from a right lateral side 170B of the frame 105, and a see-through image display 180D (FIGS. 2A-B) comprising optical assembly 180B to present a graphical user interface to a user. The wearable electronic eyewear device 100 includes the left visible light camera 114A connected to the frame 105 or the left temple 110A to capture a first image of the scene. Wearable electronic eyewear device 100 further includes the right visible light camera 114B connected to the frame 105 or the right temple 110B to capture (e.g., simultaneously with the left visible light camera 114A) a second image of the scene which partially overlaps the first image. Although not shown in FIGS. 1A-B, a processor 932 (FIG. 9) is coupled to the wearable electronic eyewear device 100 and connected to the visible light cameras 114A-B, and memory 934 (FIG. 9) accessible to the processor 932, and programming in the memory 934, may be provided in the wearable electronic eyewear device 100 itself.

Figure 1B:
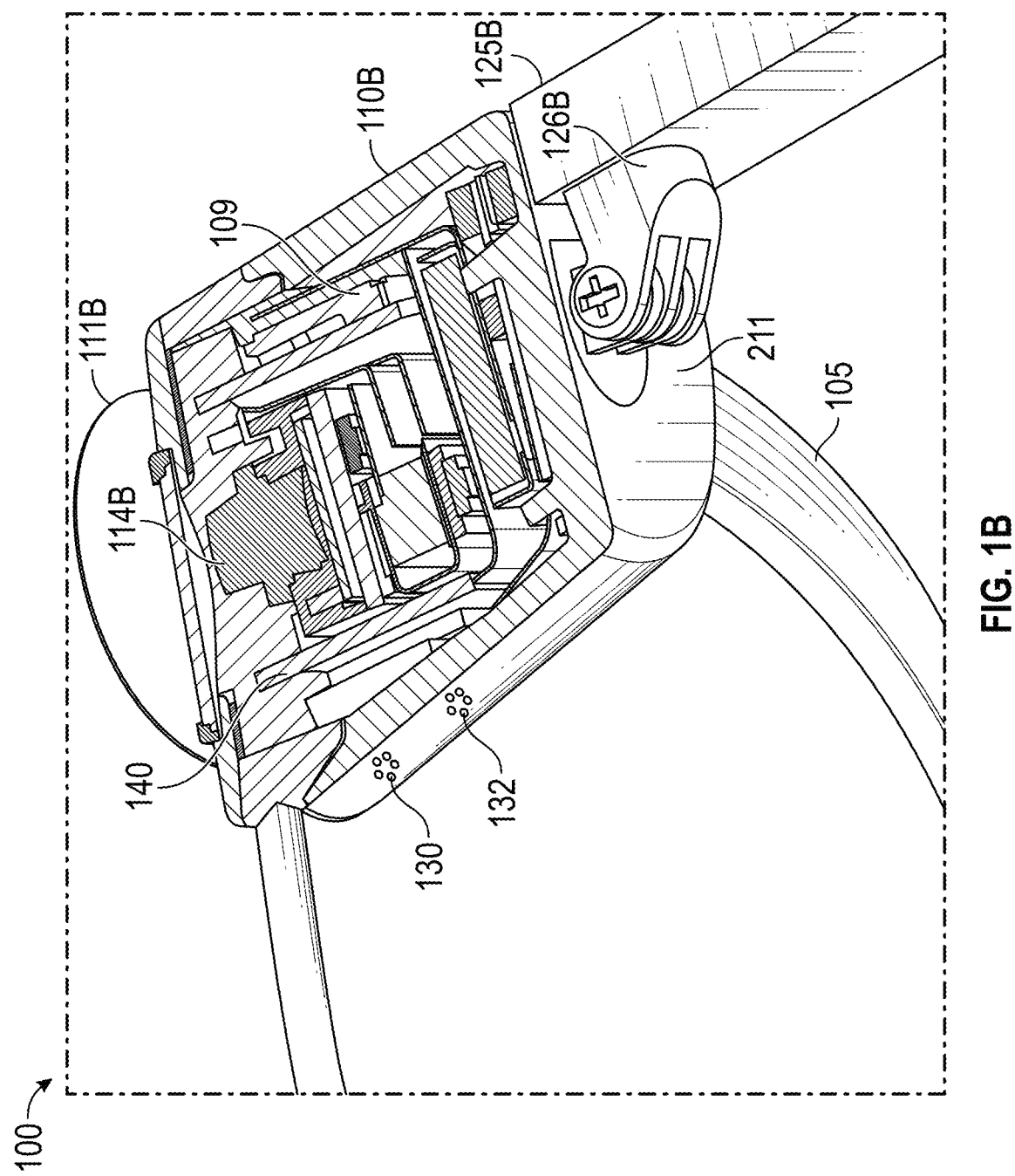
FIG. 1B illustrates a top cross-sectional view of a temple of the wearable electronic eyewear device of FIG. 1A.
Figure 2B:
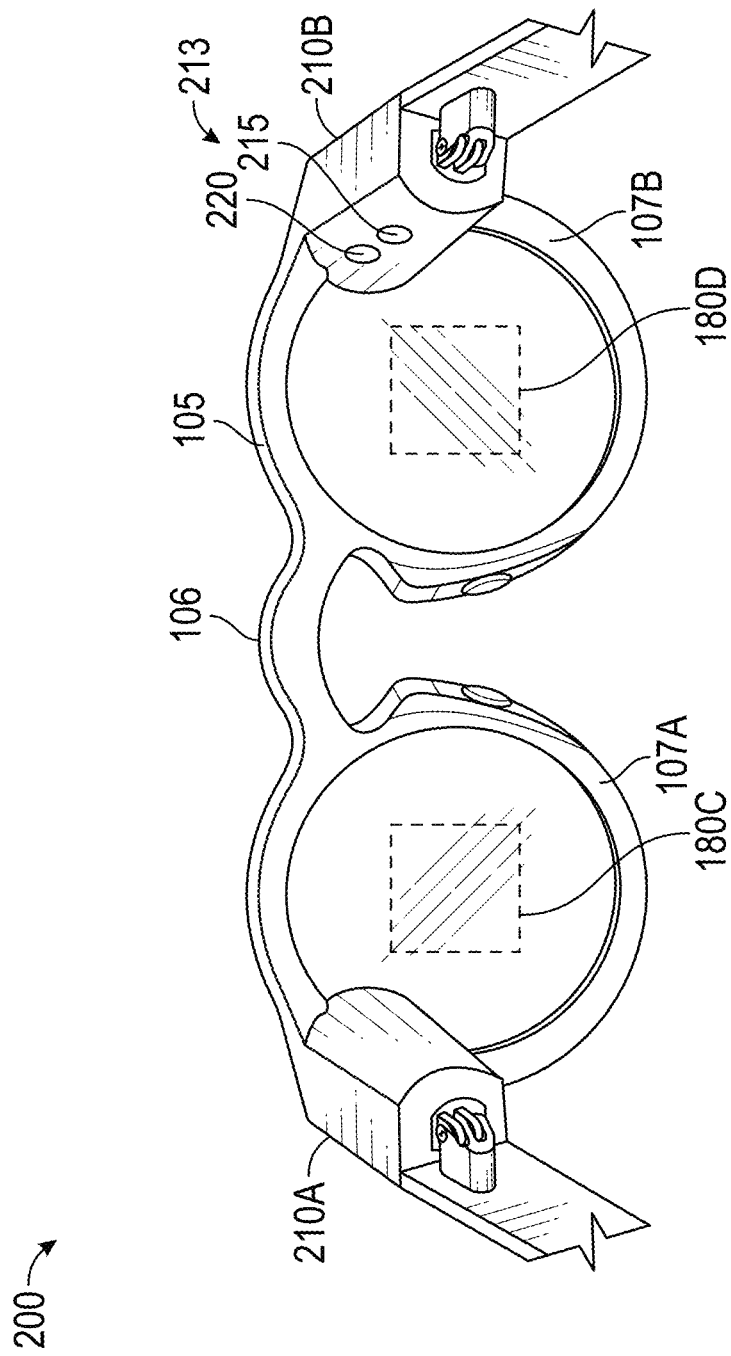
FIG. 2B illustrates a rear view of an example hardware configuration of another wearable electronic eyewear device in an example hardware configuration.
Figure 2C:
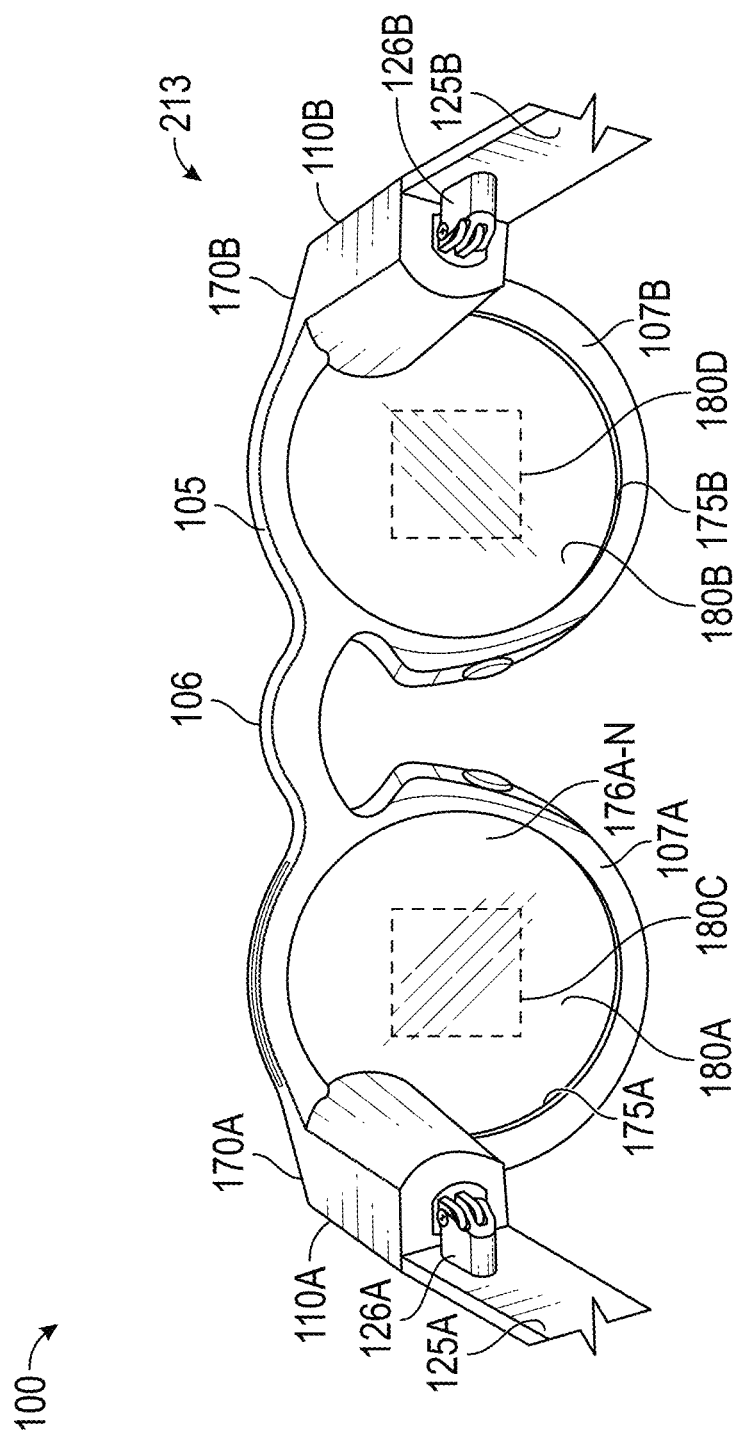
FIG. 2C and FIG. 2D illustrate rear views of example hardware configurations of a wearable electronic eyewear device including two different types of image displays.
Figure 5:
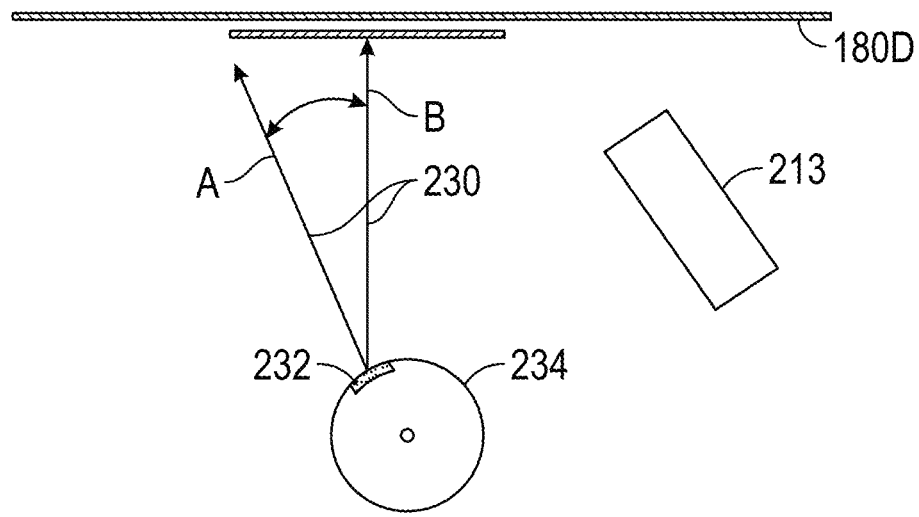
FIG. 5 illustrates detecting eye gaze direction.

Although not shown in FIG. 1A, the wearable electronic eyewear device 100 also may include a head movement tracker (element 109 of FIG. 1B) or an eye movement tracker (element 113 of FIG. 2A or element 213 of FIGS. 2B-C). Wearable electronic eyewear device 100 may further include the see-through image displays 180C-D of optical assembly 180A-B, respectfully, for presenting a sequence of displayed images, and an image display driver (element 942 of FIG. 9) coupled to the see-through image displays 180C-D of optical assembly 180A-B to control the image displays 180C-D of optical assembly 180A-B to present the sequence of displayed images 715, which are described in further detail below. Wearable electronic eyewear device 100 may further include the memory 934 and the processor 932 having access to the image display driver 942 and the memory 934, as well as programming in the memory 934. Execution of the programming by the processor 932 configures the wearable electronic eyewear device 100 to perform functions, including functions to present, via the see-through image displays 180C-D, an initial displayed image of the sequence of displayed images, the initial displayed image having an initial field of view corresponding to an initial head direction or an initial eye gaze direction 230 (FIG. 5).

Execution of the programming by the processor 932 may further configure the wearable electronic eyewear device 100 to detect movement of a user of the eyewear device by: (i) tracking, via the head movement tracker (element 109 of FIG. 1B), a head movement of a head of the user, or (ii) tracking, via an eye movement tracker (element 113 of FIG. 2A or element 213 of FIGS. 2B-C and FIG. 5), an eye movement of an eye of the user of the wearable electronic eyewear device 100. Execution of the programming by the processor 932 may further configure the wearable electronic eyewear device 100 to determine a field of view adjustment to the initial field of view of the initial displayed image based on the detected movement of the user. The field of view adjustment may include a successive field of view corresponding to a successive head direction or a successive eye direction. Execution of the programming by the processor 932 may further configure the wearable electronic eyewear device 100 to generate a successive displayed image of the sequence of displayed images based on the field of view adjustment. Execution of the programming by the processor 932 may further configure the wearable electronic eyewear device 100 to present, via the see-through image displays 180C-D of the optical assembly 180A-B, the successive displayed images.

FIG. 1B illustrates a top cross-sectional view of the temple of the wearable electronic eyewear device 100 of FIG. 1A depicting the right visible light camera 114B, a head movement tracker 109, and a circuit board 140. Construction and placement of the left visible light camera 114A is substantially similar to the right visible light camera 114B, except the connections and coupling are on the left lateral side 170A (FIG. 2A). As shown, the wearable electronic eyewear device 100 includes the right visible light camera 114B and a circuit board, which may be a flexible printed circuit board (PCB) 140. The right hinge 126B connects the right temple 110B to hinged arm 125B of the wearable electronic eyewear device 100. In some examples, components of the right visible light camera 114B, the flexible PCB 140, or other electrical connectors or contacts may be located on the right temple 110B or the right hinge 126B.

As shown, wearable electronic eyewear device 100 may include a head movement tracker 109, which includes, for example, an inertial measurement unit (IMU). An inertial measurement unit is an electronic device that measures and reports a body's specific force, angular rate, and sometimes the magnetic field surrounding the body, using a combination of accelerometers and gyroscopes, sometimes also magnetometers. The inertial measurement unit works by detecting linear acceleration using one or more accelerometers and rotational rate using one or more gyroscopes. Typical configurations of inertial measurement units contain one accelerometer, gyro, and magnetometer per axis for each of the three axes: horizontal axis for left-right movement (X), vertical axis (Y) for top-bottom movement, and depth or distance axis for up-down movement (Z). The accelerometer detects the gravity vector. The magnetometer defines the rotation in the magnetic field (e.g., facing south, north, etc.) like a compass that generates a heading reference. The three accelerometers detect acceleration along the horizontal, vertical, and depth axis defined above, which can be defined relative to the ground, the wearable electronic eyewear device 100, or the user wearing the wearable electronic eyewear device 100.

Wearable electronic eyewear device 100 may detect movement of the user of the wearable electronic eyewear device 100 by tracking, via the head movement tracker 109, the head movement of the head of the user. The head movement includes a variation of head direction on a horizontal axis, a vertical axis, or a combination thereof from the initial head direction during presentation of the initial displayed image on the image display. In one example, tracking, via the head movement tracker 109, the head movement of the head of the user includes measuring, via the inertial measurement unit 109, the initial head direction on the horizontal axis (e.g., X axis), the vertical axis (e.g., Y axis), or the combination thereof (e.g., transverse or diagonal movement). Tracking, via the head movement tracker 109, the head movement of the head of the user further includes measuring, via the inertial measurement unit 109, a successive head direction on the horizontal axis, the vertical axis, or the combination thereof during presentation of the initial displayed image.

Tracking, via the head movement tracker 109, the head movement of the head of the user may further include determining the variation of head direction based on both the initial head direction and the successive head direction. Detecting movement of the user of the wearable electronic eyewear device 100 may further include in response to tracking, via the head movement tracker 109, the head movement of the head of the user, determining that the variation of head direction exceeds a deviation angle threshold on the horizontal axis, the vertical axis, or the combination thereof. In sample configurations, the deviation angle threshold is between about 3° to 10°. As used herein, the term "about" when referring to an angle means±10% from the stated amount.

Variation along the horizontal axis slides three-dimensional objects, such as characters, Bitmojis, application icons, etc. in and out of the field of view by, for example, hiding, unhiding, or otherwise adjusting visibility of the three-dimensional object. Variation along the vertical axis, for example, when the user looks upwards, in one example, displays weather information, time of day, date, calendar appointments, etc. In another example, when the user looks downwards on the vertical axis, the wearable electronic eyewear device 100 may power down.

As shown in FIG. 1B, the right temple 110B includes temple body 211 and a temple cap, with the temple cap omitted in the cross-section of FIG. 1B. Disposed inside the right temple 110B are various interconnected circuit boards, such as PCBs or flexible PCBs 140, that include controller circuits for right visible light camera 114B, microphone(s) 130, speaker(s) 132, low-power wireless circuitry (e.g., for wireless short-range network communication via BLUETOOTH®), and high-speed wireless circuitry (e.g., for wireless local area network communication via WI-FI®).

The right visible light camera 114B is coupled to or disposed on the flexible PCB 140 and covered by a visible light camera cover lens, which is aimed through opening(s) formed in the right temple 110B. In some examples, the frame 105 connected to the right temple 110B includes the opening(s) for the visible light camera cover lens. The frame 105 may include a front-facing side configured to face outwards away from the eye of the user. The opening for the visible light camera cover lens may be formed on and through the front-facing side. In the example, the right visible light camera 114B has an outward facing angle of coverage 111B with a line of sight or perspective of the right eye of the user of the wearable electronic eyewear device 100. The visible light camera cover lens also can be adhered to an outward facing surface of the right temple 110B in which an opening is formed with an outwards facing angle of coverage, but in a different outwards direction. The coupling can also be indirect via intervening components.

Left (first) visible light camera 114A may be connected to the left see-through image display 180C of left optical assembly 180A to generate a first background scene of a first successive displayed image. The right (second) visible light camera 114B may be connected to the right see-through image display 180D of right optical assembly 180B to generate a second background scene of a second successive displayed image. The first background scene and the second background scene may partially overlap to present a three-dimensional observable area of the successive displayed image.

Flexible PCB 140 may be disposed inside the right temple 110B and coupled to one or more other components housed in the right temple 110B. Although shown as being formed on the circuit boards 140 of the right temple 110B, the right visible light camera 114B can be formed on the circuit boards 140 of the left temple 110A, the hinged arms 125A-B, or frame 105.

FIG. 2A illustrates a rear view of an example hardware configuration of a wearable electronic eyewear device 100. As shown in FIG. 2A, the wearable electronic eyewear device 100 is in a form configured for wearing by a user, which are eyeglasses in the example of FIG. 2A. The wearable electronic eyewear device 100 can take other forms and may incorporate other types of frameworks, for example, a headgear, a headset, or a helmet.

In the eyeglasses example, wearable electronic eyewear device 100 includes the frame 105 which includes the left rim 107A connected to the right rim 107B via the bridge 106 adapted for a nose of the user. The left and right rims 107A-B include respective apertures 175A-B which hold the respective optical element 180A-B, such as a lens and the see-through displays 180C-D. As used herein, the term lens is meant to cover transparent or translucent pieces of glass or plastic having curved and flat surfaces that cause light to converge/diverge or that cause little or no convergence/divergence.

Although shown as having two optical elements 180A-B, the wearable electronic eyewear device 100 can include other arrangements, such as a single optical element depending on the application or intended user of the wearable electronic eyewear device 100. As further shown, wearable electronic eyewear device 100 includes the left temple 110A adjacent the left lateral side 170A of the frame 105 and the right temple 110B adjacent the right lateral side 170B of the frame 105. The temples 110A-B may be integrated into the frame 105 on the respective sides 170A-B (as illustrated) or implemented as separate components attached to the frame 105 on the respective sides 170A-B. Alternatively, the temples 110A-B may be integrated into hinged arms 125A-B attached to the frame 105.

In the example of FIG. 2A, an eye scanner 113 may be provided that includes an infrared emitter 115 and an infrared camera 120. Visible light cameras typically include a blue light filter to block infrared light detection. In an example, the infrared camera 120 is a visible light camera, such as a low-resolution video graphic array (VGA) camera (e.g., 640×480 pixels for a total of 0.3 megapixels), with the blue filter removed. The infrared emitter 115 and the infrared camera 120 may be co-located on the frame 105. For example, both are shown as connected to the upper portion of the left rim 107A. The frame 105 or one or more of the left and right temples 110A-B may include a circuit board (not shown) that includes the infrared emitter 115 and the infrared camera 120. The infrared emitter 115 and the infrared camera 120 can be connected to the circuit board by soldering, for example.

Other arrangements of the infrared emitter 115 and infrared camera 120 may be implemented, including arrangements in which the infrared emitter 115 and infrared camera 120 are both on the right rim 107B, or in different locations on the frame 105. For example, the infrared emitter 115 may be on the left rim 107A and the infrared camera 120 may be on the right rim 107B. In another example, the infrared emitter 115 may be on the frame 105 and the infrared camera 120 may be on one of the temples 110A-B, or vice versa. The infrared emitter 115 can be connected essentially anywhere on the frame 105, left temple 110A, or right temple 110B to emit a pattern of infrared light. Similarly, the infrared camera 120 can be connected essentially anywhere on the frame 105, left temple 110A, or right temple 110B to capture at least one reflection variation in the emitted pattern of infrared light.

The infrared emitter 115 and infrared camera 120 may be arranged to face inwards towards an eye of the user with a partial or full field of view of the eye in order to identify the respective eye position and gaze direction. For example, the infrared emitter 115 and infrared camera 120 may be positioned directly in front of the eye, in the upper part of the frame 105 or in the temples 110A-B at either ends of the frame 105.

FIG. 2B illustrates a rear view of an example hardware configuration of another wearable electronic eyewear device 200. In this example configuration, the wearable electronic eyewear device 200 is depicted as including an eye scanner 213 on a right temple 210B. As shown, an infrared emitter 215 and an infrared camera 220 are co-located on the right temple 210B. It should be understood that the eye scanner 213 or one or more components of the eye scanner 213 can be located on the left temple 210A and other locations of the wearable electronic eyewear device 200, for example, the frame 105. The infrared emitter 215 and infrared camera 220 are like that of FIG. 2A, but the eye scanner 213 can be varied to be sensitive to different light wavelengths as described previously in FIG. 2A. Similar to FIG. 2A, the wearable electronic eyewear device 200 includes a frame 105 which includes a left rim 107A which is connected to a right rim 107B via a bridge 106. The left and right rims 107A-B may include respective apertures which hold the respective optical elements 180A-B comprising the see-through display 180C-D.

Figure 2D:
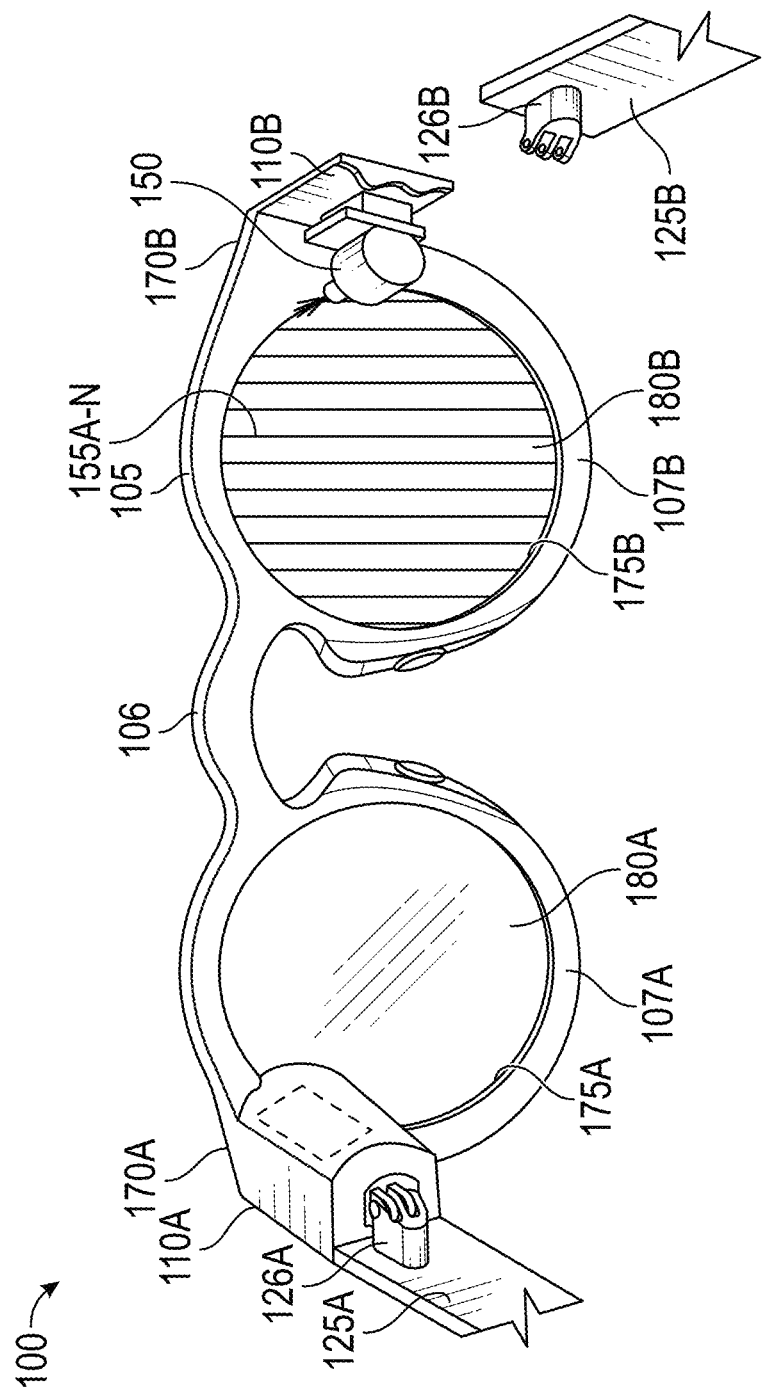

FIGS. 2C-D illustrate rear views of example hardware configurations of the wearable electronic eyewear device 100, including two different types of see-through image displays 180C-D. In one example, these see-through image displays 180C-D of optical assembly 180A-B include an integrated image display. As shown in FIG. 2C, the optical assemblies 180A-B include a suitable display matrix 180C-D of any suitable type, such as a liquid crystal display (LCD), an organic light-emitting diode (OLED) display, a waveguide display, or any other such display.

The optical assembly 180A-B also includes an optical layer or layers 176, which can include lenses, optical coatings, prisms, mirrors, waveguides, optical strips, and other optical components in any combination. The optical layers 176A-N can include a prism having a suitable size and configuration and including a first surface for receiving light from display matrix and a second surface for emitting light to the eye of the user. The prism of the optical layers 176A-N may extend over all or at least a portion of the respective apertures 175A-B formed in the left and right rims 107A-B to permit the user to see the second surface of the prism when the eye of the user is viewing through the corresponding left and right rims 107A-B. The first surface of the prism of the optical layers 176A-N faces upwardly from the frame 105 and the display matrix overlies the prism so that photons and light emitted by the display matrix impinge the first surface. The prism may be sized and shaped so that the light is refracted within the prism and is directed towards the eye of the user by the second surface of the prism of the optical layers 176A-N. In this regard, the second surface of the prism of the optical layers 176A-N can be convex to direct the light towards the center of the eye. The prism can optionally be sized and shaped to magnify the image projected by the see-through image displays 180C-D, and the light travels through the prism so that the image viewed from the second surface is larger in one or more dimensions than the image emitted from the see-through image displays 180C-D.

In another example, the see-through image displays 180C-D of optical assembly 180A-B may include a projection image display as shown in FIG. 2D. The optical assembly 180A-B includes a projector 150, which may be a three-color projector using a scanning mirror, a galvanometer, a laser projector, or other types of projectors. During operation, an optical source such as a projector 150 is disposed in or on one of the temples 110A-B of the wearable electronic eyewear device 100. Optical assembly 180A-B may include one or more optical strips 155A-N spaced apart across the width of the lens of the optical assembly 180A-B or across a depth of the lens between the front surface and the rear surface of the lens. An example of a projector 150 is shown in FIGS. 8A-8E and described in more detail below.

As the photons projected by the projector 150 travel across the lens of the optical assembly 180A-B, the photons encounter the optical strips 155A-N. When a particular photon encounters a particular optical strip, the photon is either redirected towards the user's eye, or it passes to the next optical strip. A combination of modulation of projector 150, and modulation of optical strips, may control specific photons or beams of light. In an example, a processor controls optical strips 155A-N by initiating mechanical, acoustic, or electromagnetic signals. Although shown as having two optical assemblies 180A-B, the wearable electronic eyewear device 100 can include other arrangements, such as a single or three optical assemblies, or the optical assembly 180A-B may have arranged different arrangement depending on the application or intended user of the wearable electronic eyewear device 100.

As further shown in FIGS. 2C-D, wearable electronic eyewear device 100 includes a left temple 110A adjacent the left lateral side 170A of the frame 105 and a right temple 110B adjacent the right lateral side 170B of the frame 105. The temples 110A-B may be integrated into the frame 105 on the respective lateral sides 170A-B (as illustrated) or implemented as separate components attached to the frame 105 on the respective sides 170A-B. Alternatively, the temples 110A-B may be integrated into the hinged arms 125A-B attached to the frame 105.

In one example, the see-through image displays include the first see-through image display 180C and the second see-through image display 180D. Wearable electronic eyewear device 100 may include first and second apertures 175A-B that hold the respective first and second optical assembly 180A-B. The first optical assembly 180A may include the first see-through image display 180C (e.g., a display matrix of FIG. 2C or optical strips 155A-N' and a projector 150A). The second optical assembly 180B may include the second see-through image display 180D (e.g., a display matrix of FIG. 2C or optical strips 155A-N'' and a projector 150B). The successive field of view of the successive displayed image may include an angle of view between about 15° to 30, and more specifically 24°, measured horizontally, vertically, or diagonally. The successive displayed image having the successive field of view represents a combined three-dimensional observable area visible through stitching together of two displayed images presented on the first and second image displays.

As used herein, "an angle of view" describes the angular extent of the field of view associated with the displayed images presented on each of the left and right image displays 180C-D of optical assembly 180A-B. The "angle of coverage" describes the angle range that a lens of visible light cameras 114A-B or infrared camera 220 can image. Typically, the image circle produced by a lens is large enough to cover the film or sensor completely, possibly including some vignetting (i.e., a reduction of an image's brightness or saturation toward the periphery compared to the image center). If the angle of coverage of the lens does not fill the sensor, the image circle will be visible, typically with strong vignetting toward the edge, and the effective angle of view will be limited to the angle of coverage. The "field of view" is intended to describe the field of observable area which the user of the wearable electronic eyewear device 100 can see through his or her eyes via the displayed images presented on the left and right image displays 180C-D of the optical assembly 180A-B. Image display 180C of optical assembly 180A-B can have a field of view with an angle of coverage between 15° to 30°, for example 24°, and have a resolution of 480×480 pixels.

Figure 3:
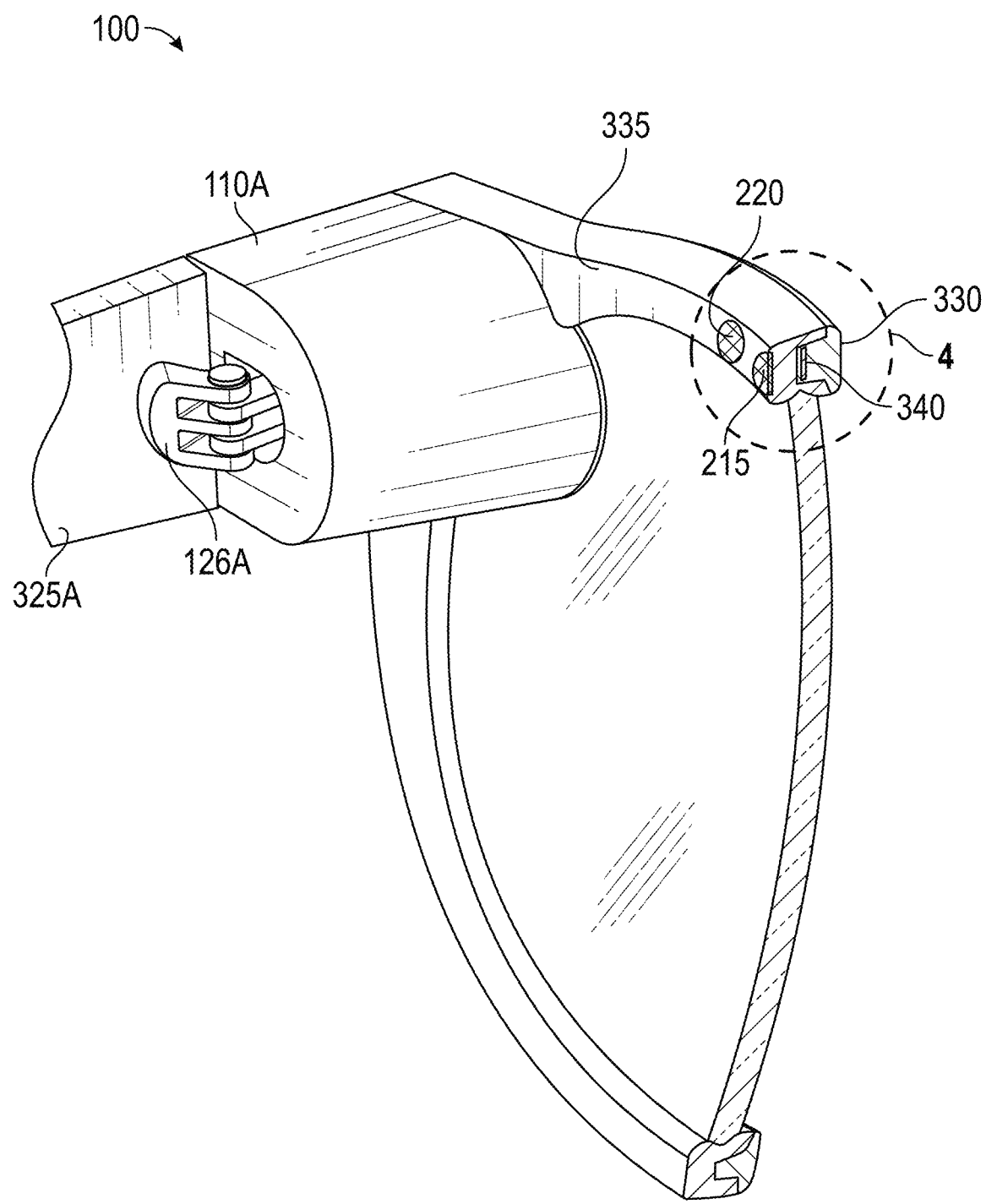
FIG. 3 illustrates a rear perspective view of the eyewear device of FIG. 2A depicting an infrared emitter, an infrared camera, a frame front, a frame back, and a circuit board.

FIG. 3 illustrates a rear perspective view of the wearable electronic eyewear device 100 of FIG. 2A. The wearable electronic eyewear device 100 includes an infrared emitter 215, infrared camera 220, a frame front 330, a frame back 335, and a circuit board 340. It can be seen in FIG. 3 that the upper portion of the left rim of the frame of the wearable electronic eyewear device 100 may include the frame front 330 and the frame back 335. An opening for the infrared emitter 215 is formed on the frame back 335.

As shown in the encircled cross-section 4 in the upper middle portion of the left rim of the frame, a circuit board, which may be a flexible PCB 340, is sandwiched between the frame front 330 and the frame back 335. Also shown in further detail is the attachment of the left temple 110A to the left hinged arm 325A via the left hinge 126A. In some examples, components of the eye movement tracker 213, including the infrared emitter 215, the flexible PCB 340, or other electrical connectors or contacts may be located on the left hinged arm 325A or the left hinge 126A.

Figure 4:
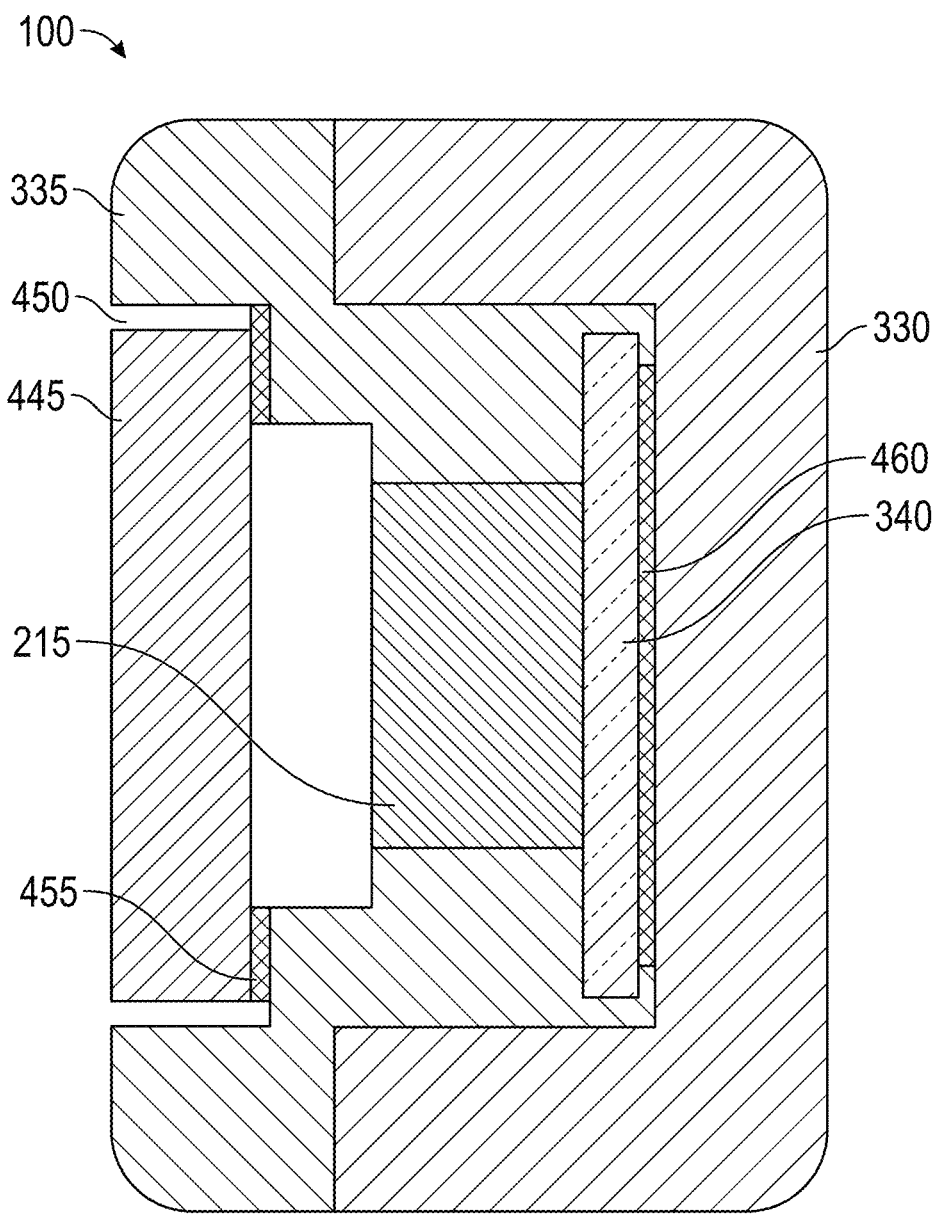
FIG. 4 illustrates a cross-sectional view taken through the infrared emitter and the frame of the eyewear device of FIG. 3.

FIG. 4 is a cross-sectional view through the infrared emitter 215 and the frame corresponding to the encircled cross-section 4 of the eyewear device of FIG. 3. Multiple layers of the wearable electronic eyewear device 100 are illustrated in the cross-section of FIG. 4. As shown, the frame includes the frame front 330 and the frame back 335. The flexible PCB 340 is disposed on the frame front 330 and connected to the frame back 335. The infrared emitter 215 is disposed on the flexible PCB 340 and covered by an infrared emitter cover lens 445. For example, the infrared emitter 215 may be reflowed to the back of the flexible PCB 340. Reflowing attaches the infrared emitter 215 to contact pad(s) formed on the back of the flexible PCB 340 by subjecting the flexible PCB 340 to controlled heat which melts a solder paste to connect the two components. In one example, reflowing is used to surface mount the infrared emitter 215 on the flexible PCB 340 and electrically connect the two components. However, it should be understood that through-holes can be used to connect leads from the infrared emitter 215 to the flexible PCB 340 via interconnects, for example.

The frame back 335 may include an infrared emitter opening 450 for the infrared emitter cover lens 445. The infrared emitter opening 450 is formed on a rear-facing side of the frame back 335 that is configured to face inwards towards the eye of the user. In the example, the flexible PCB 340 can be connected to the frame front 330 via the flexible PCB adhesive 460. The infrared emitter cover lens 445 can be connected to the frame back 335 via infrared emitter cover lens adhesive 455. The coupling also can be indirect via intervening components.

Figure 6:
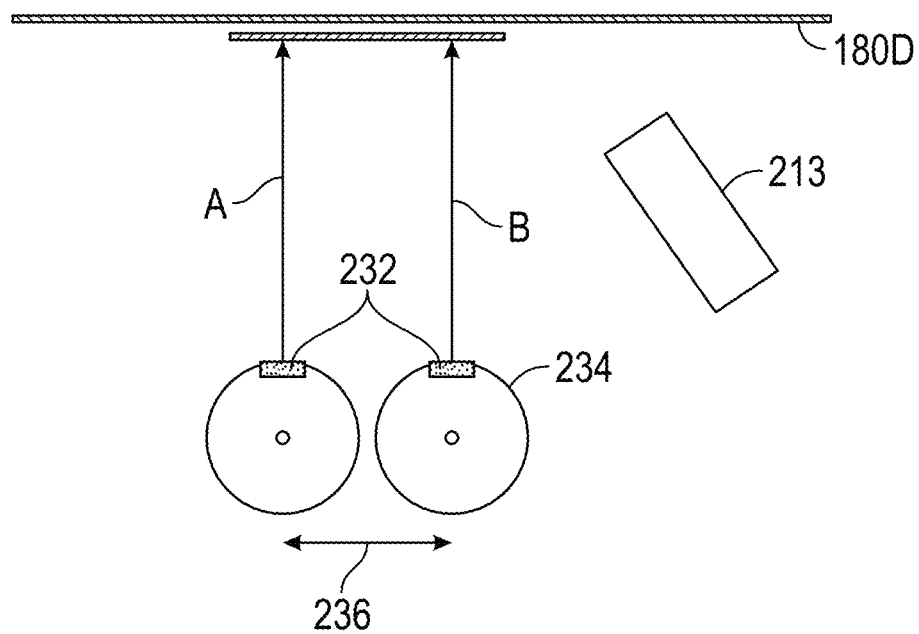
FIG. 6 illustrates detecting eye position.

In an example, the processor 932 utilizes eye tracker 213 to determine an eye gaze direction 230 of a wearer's eye 234 as shown in FIG. 5, and an eye position 236 of the wearer's eye 234 within an eyebox as shown in FIG. 6. The eye tracker 213 may be a scanner which uses infrared light illumination (e.g., near-infrared, short-wavelength infrared, mid-wavelength infrared, long-wavelength infrared, or far infrared) to captured image of reflection variations of infrared light from the eye 234 to determine the gaze direction 230 of a pupil 232 of the eye 234, and also the eye position 236 with respect to the see-through display 180D.

Figure 7:
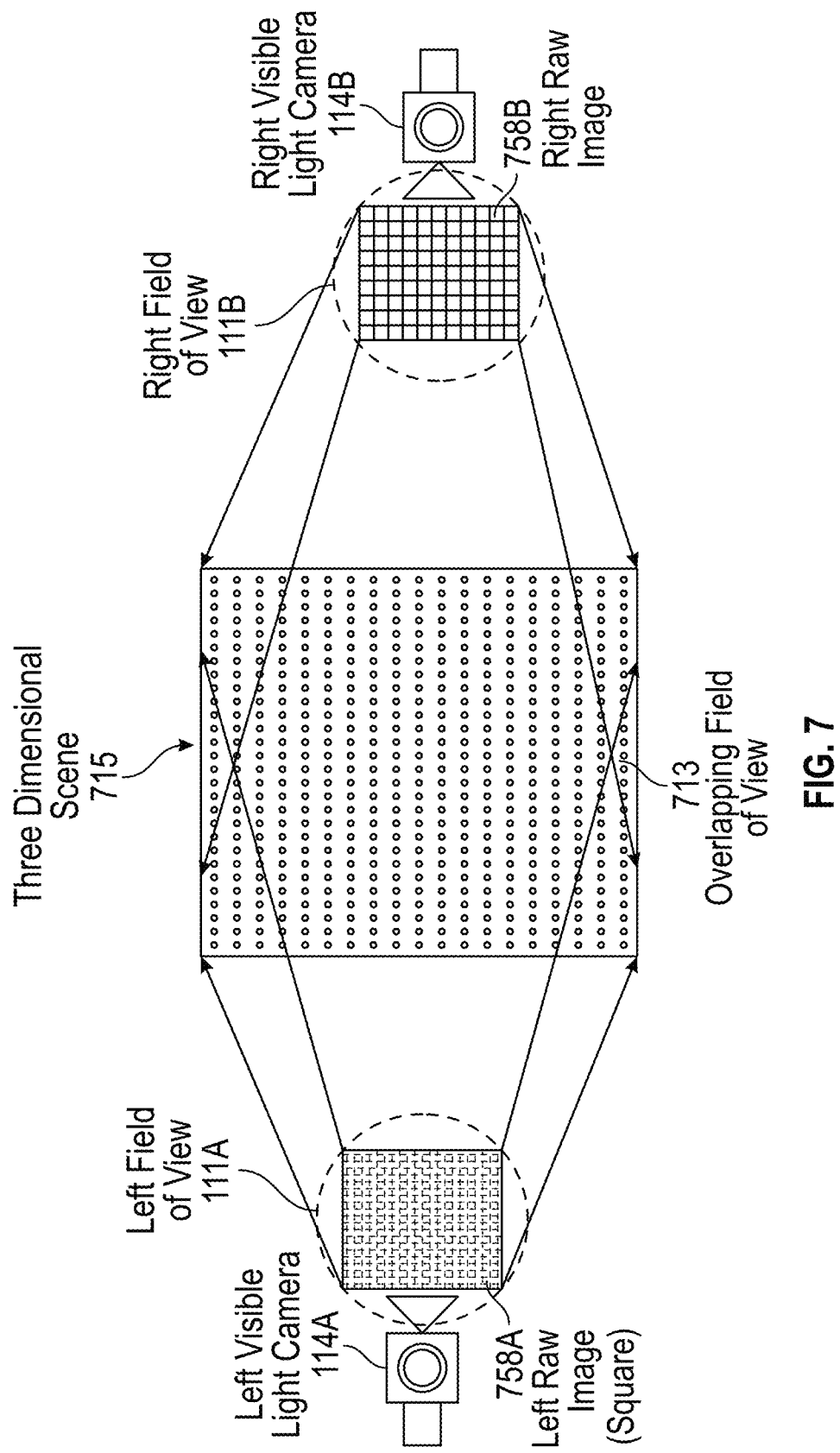
FIG. 7 illustrates an example of visible light captured by the left visible light camera as a left raw image and visible light captured by the right visible light camera as a right raw image.
Figure 9:
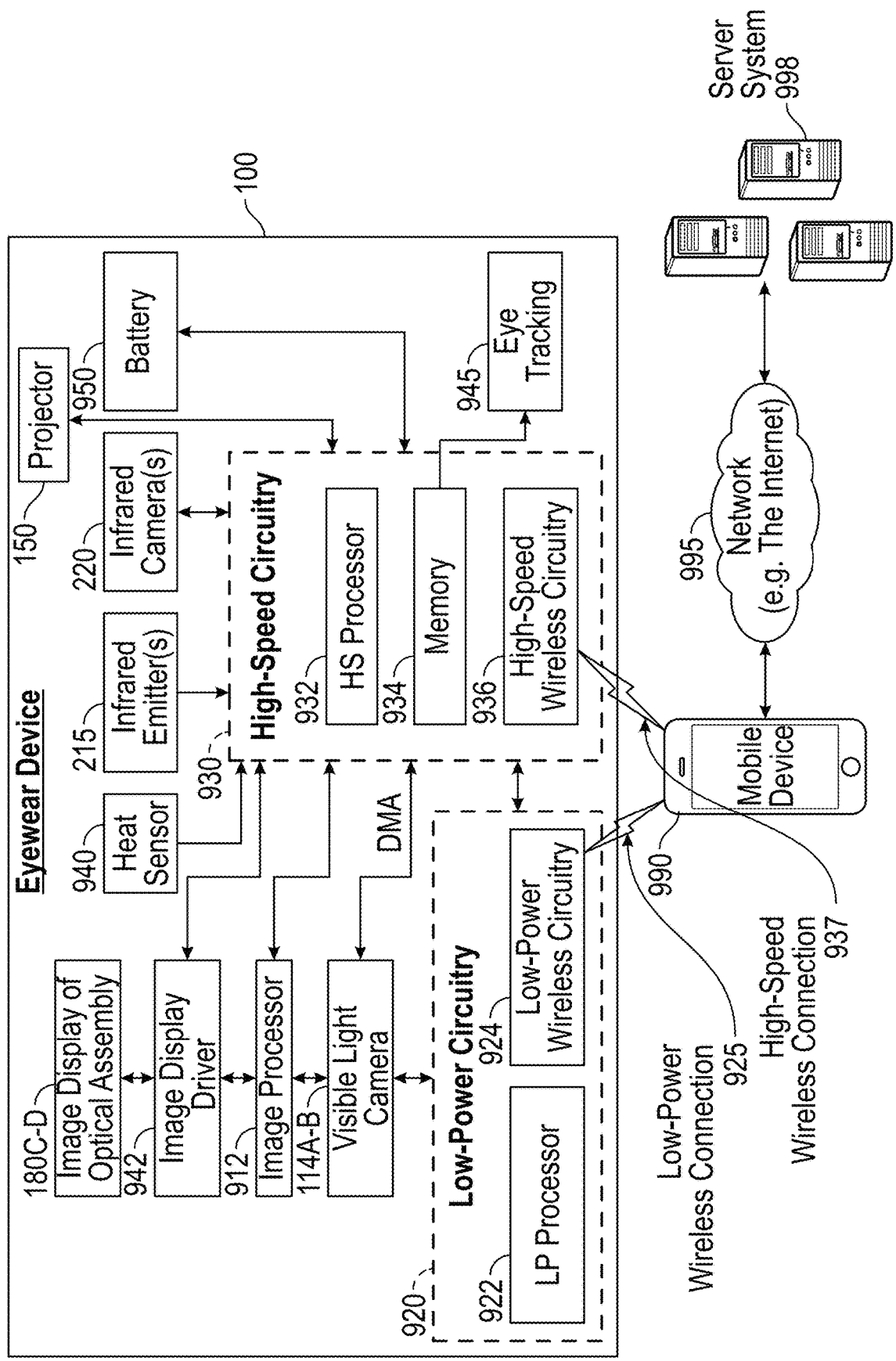
FIG. 9 illustrates a block diagram of electronic components of the wearable electronic eyewear device including the projector.

FIG. 7 illustrates an example of capturing visible light with cameras 114A-B. Visible light is captured by the left visible light camera 114A with a round field of view (FOV) 111A. A chosen rectangular left raw image 758A is used for image processing by image processor 912 (FIG. 9). Visible light is also captured by the right visible light camera 114B with a round FOV 111B. A rectangular right raw image 758B chosen by the image processor 912 is used for image processing by processor 912. Based on processing of the left raw image 758A and the right raw image 758B having an overlapping field of view 713, a three-dimensional image 715 of a three-dimensional scene, referred to hereafter as an immersive image, is generated by processor 912 and displayed by displays 180C and 180D and which is viewable by the user.

Figure 8A:
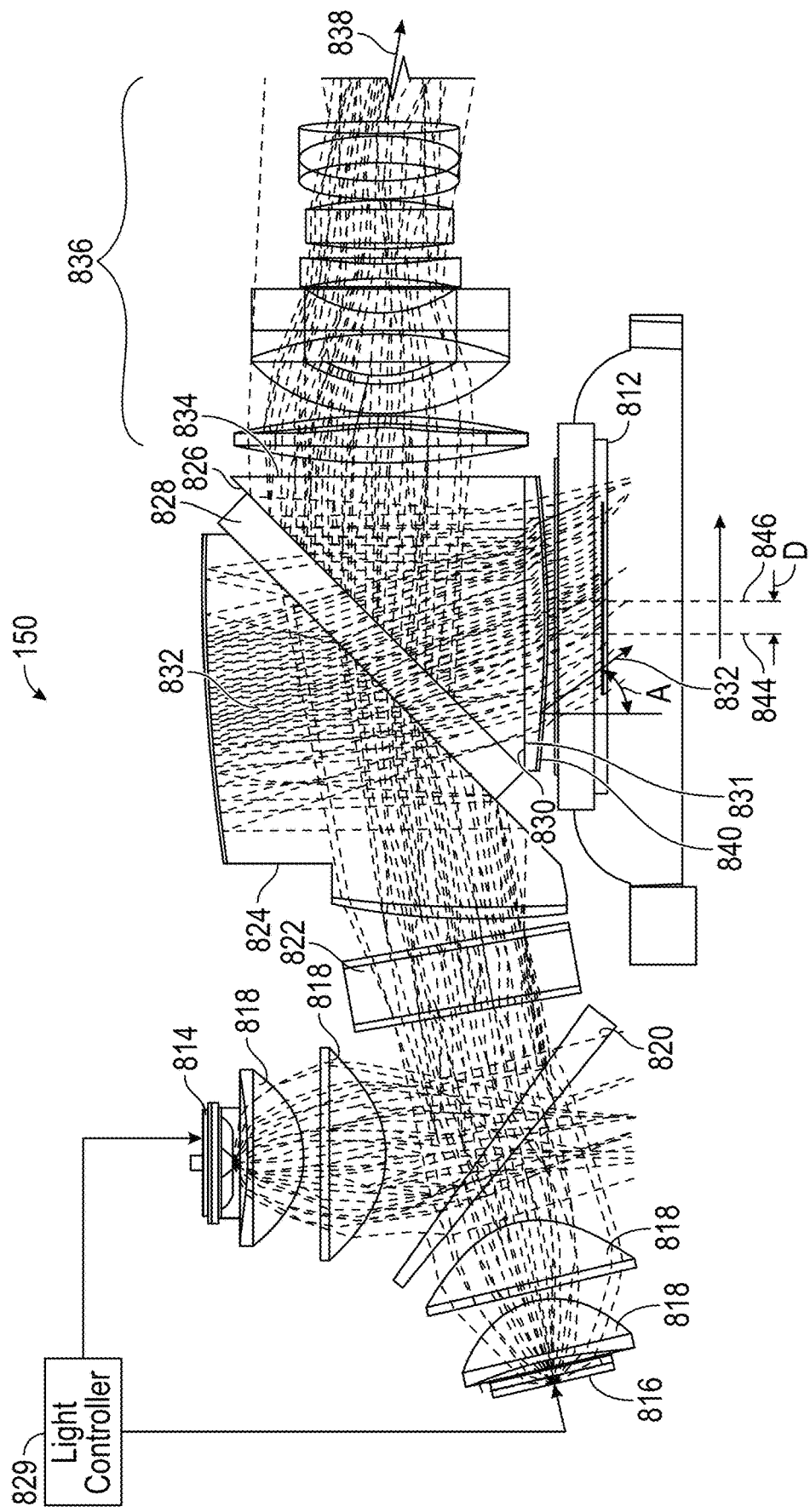
FIG. 8A illustrates a side view of a projector configured to generate a visual image.

FIG. 8A is a side view of a projector 150 configured to generate an image, such as shown and described as projector 150 in FIG. 2D. Projector 150 may include a display 812 configured to modulate light beams impinging thereon from one or more colored light sources to generate the image, shown as being generated by a red/blue light-emitting diode (LED) 814 and a green LED 816. The red/blue LED 814 selectively emits a red and blue light beam 832 that passes through respective condenser lenses 818, reflects off a dichroic lens 820, through a fly's eye 822, through a powered prism 824 and a reverse total internal reflection (RTIR) light prism 826 separated from each other by a plano spacer 828, and output at a bottom output 830 of RTIR light prism 826 to display 812 as shown. The green LED 816 selectively emits a green light beam 832 through respective condenser lenses 818 and passes through the dichroic lens 820, fly's eye 822, through the powered prism 824 and the RTIR light prism 826, and output from the bottom RTIR light prism output 830 to display 812. The LEDs 814 and 816 are time sequenced by a light controller 829 so that only one light is on at a time, and the display 812 modulates only one colored light beam 832 at a time. The modulated light from the display 812 produces an image that is directed back into RTIR light prism 826 through bottom output 830, reflects off plano spacer 828, and exits through a vertical RTIR light prism output 834 to projection lens elements 836 for display on an image plane. The human eye integrates the modulated colored light beams displayed on the image plane to perceive a color image. The display 812 may be a digital micromirror device (DMD)® display manufactured by Texas Instruments of Dallas, Texas, although other displays are possible. Only this portion of the projector 150 described herein so far is a known digital light projection (DLP)® system architecture such as manufactured by Texas Instruments of Dallas, Texas.

To increase a field of view (FOV) of this described DLP® projector from a diagonal 25-degree FOV to a diagonal 46-degree FOV, and maintaining resolution and display pixel pitch, this would result in a 1.9× scale of the display image diagonal. By maintaining the projection lens f-stop number (f/#) and maintaining telecentricity at the projection lens, this increase in display diagonal would typically translate into a direct 1.9× scale of the diameter of the largest element in the projection lens. Additionally, due to the need to pass the colored light beams through the RTIR prism 826, the back focal length of the projection lens would also scale, resulting in an overall length increase as well.

As shown and described with reference to FIG. 8A-FIG. 8E, by incorporating a positive power field lens, the projection lens telecentricity is maintained, but the ray bundle at the last element is significantly reduced, also reducing the size needed for the back focal length and overall length of the projection lens. A field lens 840 is a positive-powered lens that comes after an objective lens and before an image plane. Additional benefit is seen on the illumination side of the projector, as the size of the powered prism 24 surfaces are reduced due to the power in the field lens. In this description, the selected field lens power is reduced by 17% in each dimension (x, y, z).

There is, however, a challenge that a field lens presents specifically for a DLP® display projector. A DLP® display projector requires illumination of the DMD® display 812 at a large 34-degree input angle, and a field lens centered over the DMD® display 812 poses a problem of uniform illumination on one side of the DMD® display 812. To overcome this limitation, the projection lens may be designed to support a much larger image circle diameter, and further, the display 812 may be laterally displaced/shifted in the image plane toward a more uniform position. This display 812 displacement results in a boresight shift (i.e., the FOV of the projector is shifted from being parallel to the optical axis of rotational symmetry). This is advantageous in an augmented reality (AR) system because this enables the projector at a non-normal angle to a waveguide, such as used in eyewear optics, allowing for a better fit in the industrial design supporting a larger pantoscopic tilt.

In sample configurations, a curved field lens 840 is coupled adjacent to a bottom prism face 831 forming the bottom output 830 of the RTIR light prism 826. The curved field lens 840 is configured to decenter and angle the colored light beams 832 away from the bottom prism face 831 an angle A as shown, and evenly illuminate the display 812 that is shifted to the right in the image plane. The field lens 840 angles the light beams 832 at angle A with respect to a normal of the bottom prism face 831, such that the light beams 832 are not output perpendicular to the normal of prism face 831. The curved field lens 840 has an optical axis that is off center from a center of the prism face 831.

A center 846 of the display 812 is shifted to the right of a center 844 of the bottom prism face 831 by a distance D. The decentering of the colored light beams 832 generated by field lens 840, and shifting/positioning of the display 812, results in a favorable shifted boresight image generated by display 812 as indicated at 838 that exits the projection lens elements 836. The curved field lens 840 enables use of smaller system components, wherein the greater the curvature of the curved field lens 840 the smaller the projector 150, as will be discussed with reference to FIG. 8D.

Figure 8B:
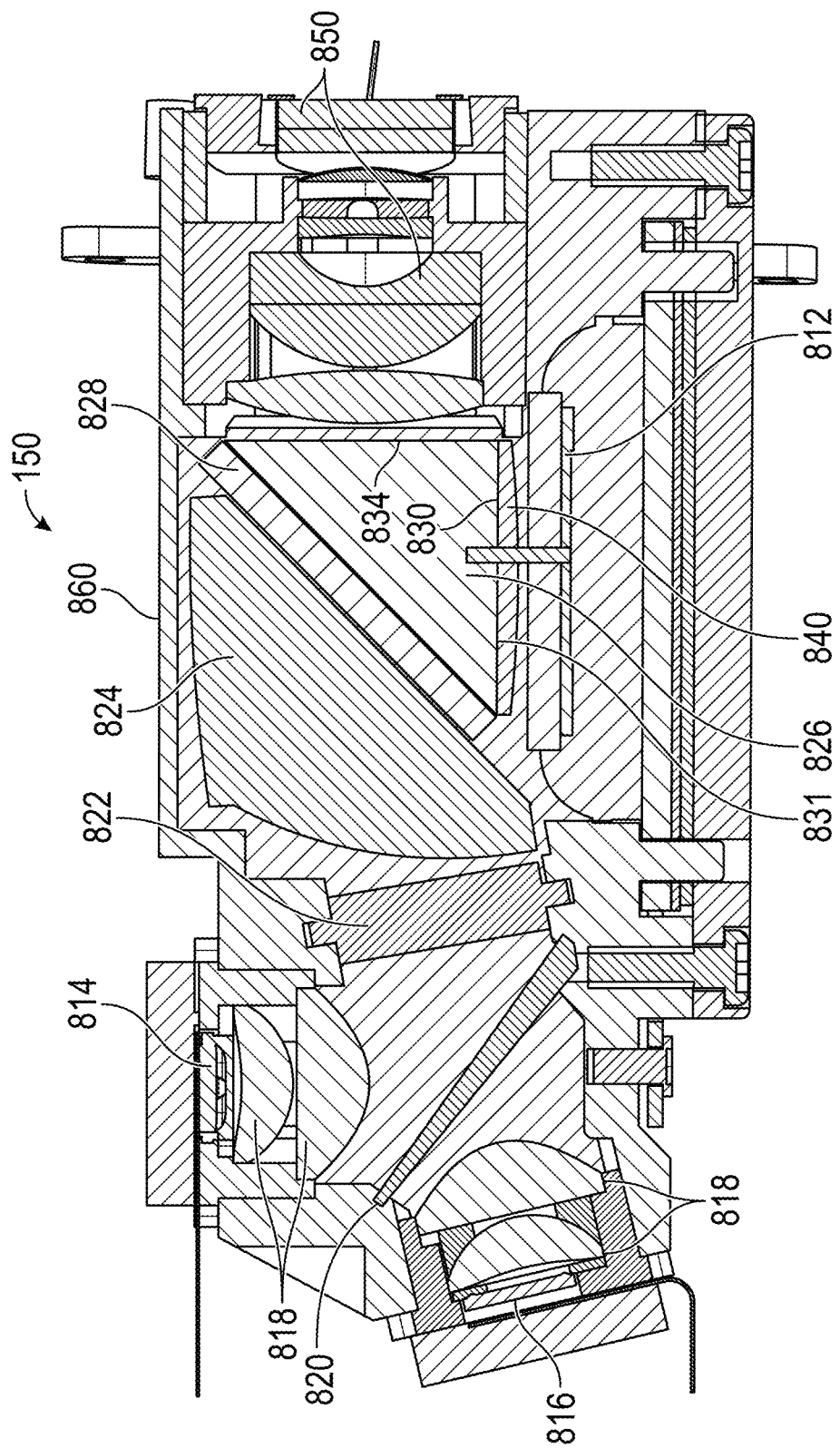
FIG. 8B illustrates a side sectional view of a housing that encompasses the components of the system described with reference to FIG. 8A.

FIG. 8B illustrates a side sectional view of a housing 860 that encompasses the components of the projector 150 described with reference to FIG. 8A. In sample configurations, the housing 860 may comprise a material that can withstand elevated temperatures, such as generated by the light beams 832, such as metal or synthetic materials.

Figure 8C:
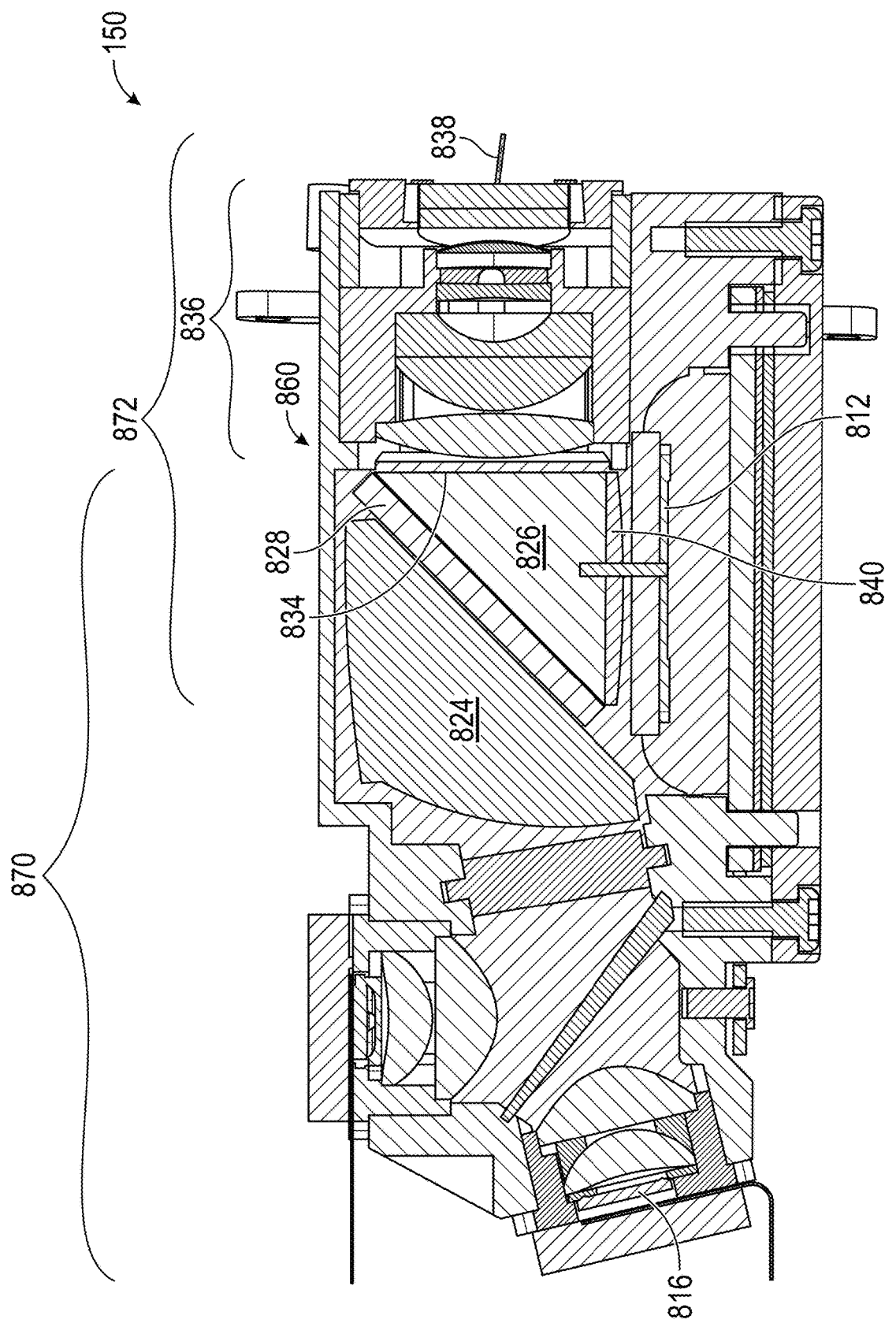
FIG. 8C illustrates the portion of the system of FIG. 8A that is an illumination section of a projector and the portion of the projector that includes a projection lens.

FIG. 8C illustrates the portion of projector 150 that is the illumination section 870 of projector 150, and the portion of projector 150 that is the projection lens 872. The illumination section 870 is considered to extend from the LED 816 to the vertical output 834 formed by a vertical prism face of the RTIR light prism 826 proximate the projection lens elements 836. The projection lens 872 is considered to extend from the left side of projection lens 840 to the right end of the projection lens elements 836.

Figure 8D:
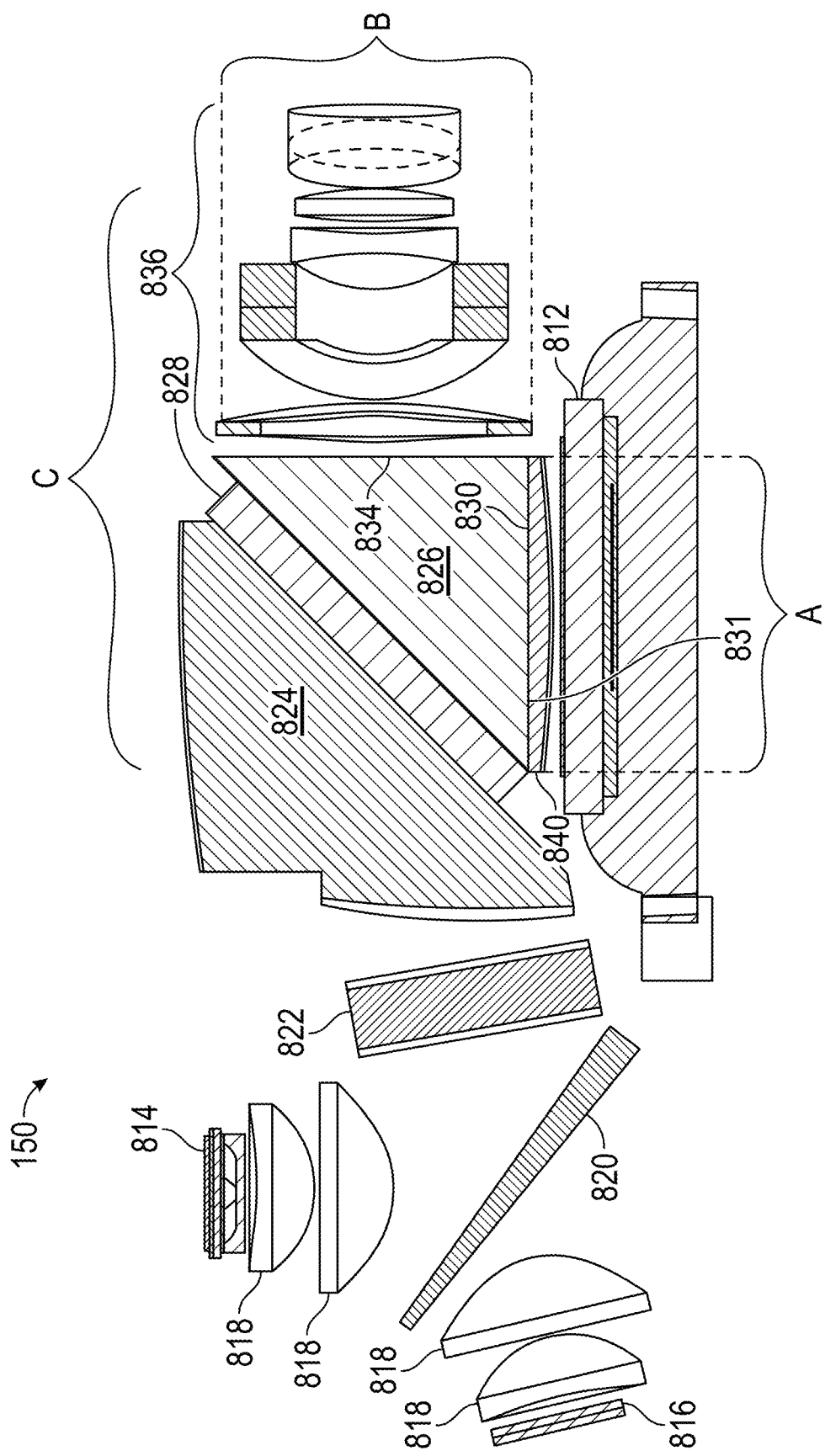
FIG. 8D illustrates graphs of system dimensions as a function of the curvature of the field lens.
Figure 8D:
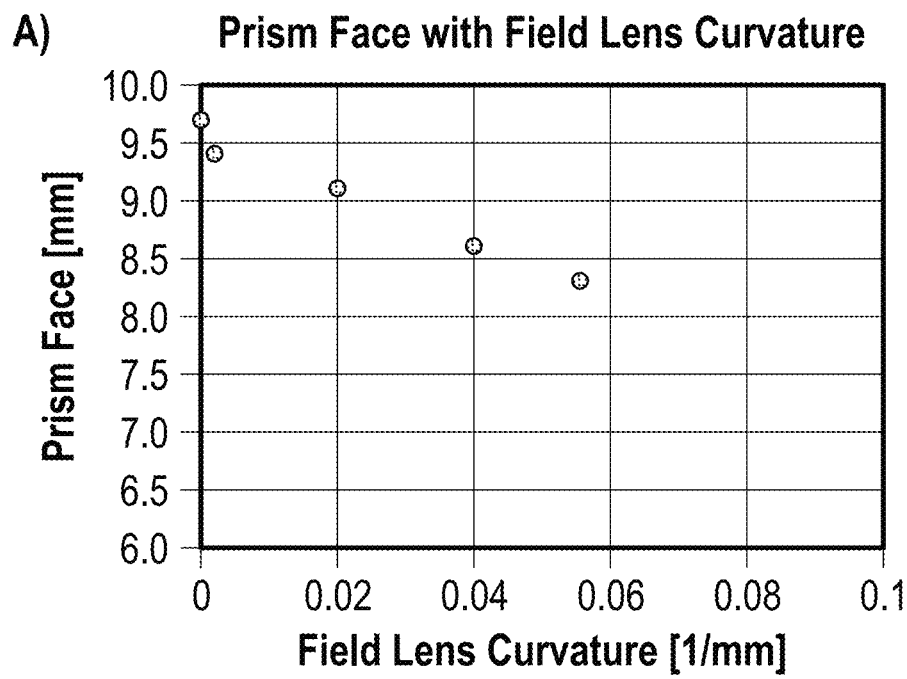
Figure 8D:
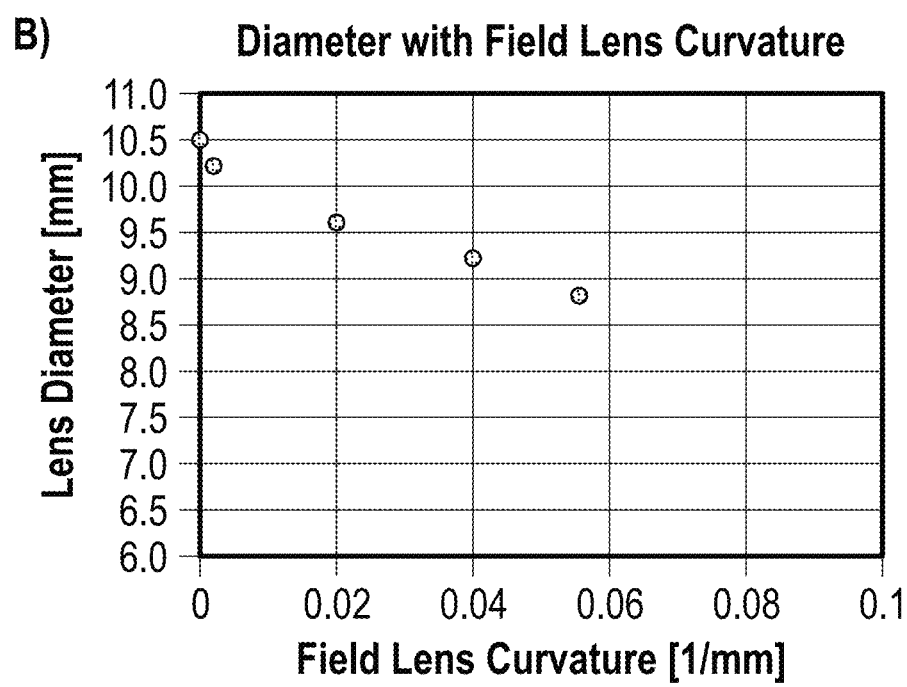
Figure 8D:
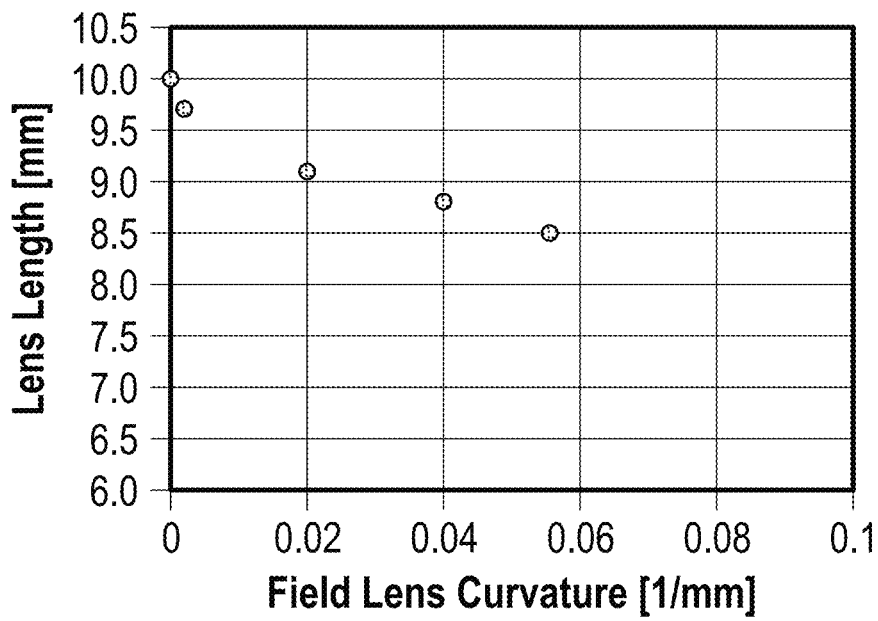

FIG. 8D illustrates graphs of system dimensions as a function of the curvature of the field lens 840.

Graph A depicts the width dimension of the prism face 831 of RTIR light prism 826 at output 830 as a function of the curvature of field lens 840. As can be seen, the greater the curvature of the field lens 840, the narrower/smaller the prism face 831 of the RTIR prism 826 and the smaller the size of system 150.

Graph B depicts the diameter of the projection lens elements 836 as a function of the field lens 840 curvature. As can be seen, the greater the curvature of the field lens 840, the smaller the diameter of the projection lens elements 836.

Graph C depicts the length of projection lens 872 as a function of the curvature of field lens 840. As can be seen, the greater the curvature of the field lens 840, the shorter the length of the projection lens 872.

Figure 8E:
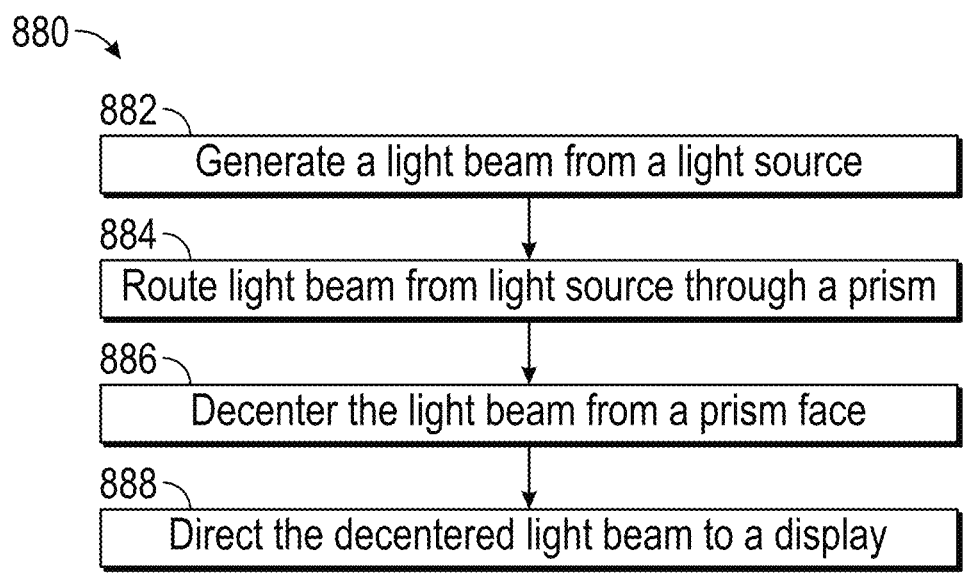
FIG. 8E illustrates a method of generating a decentered light beam using the field lens, and displacing a display to generate a display image.

FIG. 8E illustrates a method 880 of generating a decentered light beam using the field lens 840 and of generating a display image in a sample implementation.

At block 882, the light controller 829 controls the colored light sources 814 and 816 to selectively generate a red, green, and blue (RGB) colored light beam. The light sources are selectively controlled such that only one colored light beam 832 is generated at a time.

At block 884, the power prism 824 and the RTIR prism 826 route the light beams 832 therethrough. The light beams 832 are internally reflected and provided to the prism face 831 forming the output 830.

At block 886, the curved field lens 840 decenters the light beams 832 from the prism face 831. The curvature of the field lens 840 angles the light beams 832 at an angle A with respect to the prism face 831 such that the angle A is not normal to the prism face 831.

At block 888, the light beams 832 are directed by the field lens 840 to the display 812 which modulates the light beams 832 to form a visual image. The center of display 812 is shifted with respect to a center of the prism face 831, and the modulated light beams 832 uniformly illuminate the display. The light image has a downward boresight as shown at 838.

As noted above with respect to FIG. 8D, the dimension of illumination section 870 is a function of the curvature of the curved field lens 840, and the dimension of the projection lens 872 is a function of the curvature of the curved field lens 840. The greater the curvature of the field lens 840, the smaller the dimensions of components forming the projector 150 and thus the smaller the dimensions of illumination section 870 and projection lens 872.

FIG. 9 illustrates a high-level functional block diagram including example electronic components disposed in wearable electronic eyewear device 100 or 200. The illustrated electronic components include the processor 932, the memory 934, and the see-through image display 180C and 180D.

Memory 934 includes instructions for execution by processor 932 to implement the functionality of wearable electronic eyewear devices 100/200, including instructions for processor 932 to control in the image 715. Processor 932 receives power from battery 950 and executes the instructions stored in memory 934, or integrated with the processor 932 on-chip, to perform the functionality of wearable electronic eyewear devices 100/200 and to communicate with external devices via wireless connections.

The wearable electronic eyewear device 100 may incorporate an eye movement tracker 213 (e.g., shown as infrared emitter 215 and infrared camera 220 in FIG. 2B) and may provide user interface adjustments via a mobile device 990 and a server system 998 connected via various networks. Mobile device 990 may be a smartphone, tablet, laptop computer, access point, or any other such device capable of connecting with the wearable electronic eyewear device 100 using both a low-power wireless connection 925 and a high-speed wireless connection 937. Mobile device 990 is further connected to server system 998 via a network 995. The network 995 may include any combination of wired and wireless connections.

Wearable electronic eyewear device 100 may include at least two visible light cameras 114A-B (one associated with the left lateral side 170A and one associated with the right lateral side 170B). Wearable electronic eyewear device 100 further includes two see-through image displays 180C-D of the optical assembly 180A-B (one associated with the left lateral side 170A and one associated with the right lateral side 170B). Wearable electronic eyewear device 100 also includes image display driver 942, image processor 912, low-power circuitry 920, and high-speed circuitry 930. The components shown in FIG. 9 for the wearable electronic eyewear devices 100 and 200 are located on one or more circuit boards, for example, a PCB or flexible PCB 140, in the temples. Alternatively, or additionally, the depicted components can be located in the temples, frames, hinges, hinged arms, or bridge of the wearable electronic eyewear devices 100 and 200. Left and right visible light cameras 114A-B can include digital camera elements such as a complementary metal-oxide-semiconductor (CMOS) image sensor, charge coupled device, a lens, or any other respective visible or light capturing elements that may be used to capture data, including images of scenes with unknown objects.

Eye movement tracking programming 945 implements the user interface field of view adjustment instructions, including instructions to cause the wearable electronic eyewear device 100 to track, via the eye movement tracker 213, the eye movement of the eye of the user of the wearable electronic eyewear devices 100 or 200. Other implemented instructions (functions) cause the wearable electronic eyewear devices 100 and 200 to determine the FOV adjustment to the initial FOV 111A-B based on the detected eye movement of the user corresponding to a successive eye direction. Further implemented instructions generate a successive displayed image of the sequence of displayed images based on the field of view adjustment. The successive displayed image is produced as visible output to the user via the user interface. This visible output appears on the see-through image displays 180C-D of optical assembly 180A-B, which is driven by image display driver 942 to present the sequence of displayed images, including the initial displayed image with the initial field of view and the successive displayed image with the successive field of view.

As shown in FIG. 9, high-speed circuitry 930 includes high-speed processor 932, memory 934, and high-speed wireless circuitry 936. In the example, the image display driver 942 is coupled to the high-speed circuitry 930 and operated by the high-speed processor 932 in order to drive the left and right image displays 180C-D of the optical assembly 180A-B. High-speed processor 932 may be any processor capable of managing high-speed communications and operation of any general computing system needed for wearable electronic eyewear device 100. High-speed processor 932 includes processing resources needed for managing high-speed data transfers on high-speed wireless connection 937 to a wireless local area network (WLAN) using high-speed wireless circuitry 936. In certain examples, the high-speed processor 932 executes an operating system such as a LINUX operating system or other such operating system of the wearable electronic eyewear device 100 and the operating system is stored in memory 934 for execution. In addition to any other responsibilities, the high-speed processor 932 executing a software architecture for the wearable electronic eyewear device 100 is used to manage data transfers with high-speed wireless circuitry 936. In certain examples, high-speed wireless circuitry 936 is configured to implement Institute of Electrical and Electronic Engineers (IEEE) 802.11 communication standards, also referred to herein as WI-FI®. In other examples, other high-speed communications standards may be implemented by high-speed wireless circuitry 936.

Low-power wireless circuitry 924 and the high-speed wireless circuitry 936 of the wearable electronic eyewear device 100 and 200 can include short range transceivers (BLUETOOTH®) and wireless wide, local, or wide area network transceivers (e.g., cellular or WI-FI®). Mobile device 990, including the transceivers communicating via the low-power wireless connection 925 and high-speed wireless connection 937, may be implemented using details of the architecture of the wearable electronic eyewear device 100, as can other elements of network 995.

Memory 934 includes any storage device capable of storing various data and applications, including, among other things, color maps, camera data generated by the left and right visible light cameras 114A-B and the image processor 912, as well as images generated for display by the image display driver 942 on the see-through image displays 180C-D of the optical assembly 180A-B. While memory 934 is shown as integrated with high-speed circuitry 930, in other examples, memory 934 may be an independent standalone element of the wearable electronic eyewear device 100. In certain such examples, electrical routing lines may provide a connection through a system on chip (e.g., SOC 1000 in FIG. 10) that includes the high-speed processor 932 from the image processor 912 or low-power processor 922 to the memory 934. In other examples, the high-speed processor 932 may manage addressing of memory 934 such that the low-power processor 922 will boot the high-speed processor 932 any time that a read or write operation involving memory 934 is needed.

Server system 998 may be one or more computing devices as part of a service or network computing system, for example, that includes a processor, a memory, and network communication interface to communicate over the network 995 with the mobile device 990 and wearable electronic eyewear devices 100/200. Wearable electronic eyewear devices 100 and 200 are connected with a host computer. For example, the wearable electronic eyewear device 100 is paired with the mobile device 990 via the high-speed wireless connection 937 or directly connected to the server system 998 via the network 995.

Output components of the wearable electronic eyewear device 100 include visual components, such as the left and right image displays 180C-D of optical assembly 180A-B as described in FIGS. 2C-D (e.g., a display such as a liquid crystal display (LCD), a plasma display panel (PDP), a light emitting diode (LED) display, a projector, or a waveguide). The image displays 180C-D of the optical assembly 180A-B are driven by the image display driver 942. The output components of the wearable electronic eyewear device 100 further include acoustic components (e.g., speakers), haptic components (e.g., a vibratory motor), other signal generators, and so forth. The input components of the wearable electronic eyewear devices 100 and 200, the mobile device 990, and server system 998, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

Wearable electronic eyewear device 100 may optionally include additional peripheral device elements such as ambient light and spectral sensors, biometric sensors, heat sensor 940, or other display elements integrated with wearable electronic eyewear device 100. For example, the peripheral device elements may include any I/O components including output components, motion components, position components, or any other such elements described herein. The wearable electronic eyewear device 100 can take other forms and may incorporate other types of frameworks, for example, a headgear, a headset, or a helmet.

For example, the biometric components of the wearable electronic eyewear device 100 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), WI-FI® or BLUETOOTH® transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over wireless connections 925 and 937 from the mobile device 990 via the low-power wireless circuitry 924 or high-speed wireless circuitry 936.

According to some examples, an "application" or "applications" are program(s) that execute functions defined in the programs. Various programming languages can be employed to produce one or more of the applications, structured in a variety of manners, such as object-oriented programming languages (e.g., Objective-C, Java, or C++) or procedural programming languages (e.g., C or assembly language). In a specific example, a third party application (e.g., an application developed using the ANDROID™ or IOS™ software development kit (SDK) by an entity other than the vendor of the particular platform) may be mobile software running on a mobile operating system such as IOS™, ANDROID™ WINDOWS® Phone, or another mobile operating systems. In this example, the third-party application can invoke API calls provided by the operating system to facilitate functionality described herein.

In a sample configuration, the wearable electronic eyewear device 100 described herein may be designed to optimize the thermal envelope to indefinitely support at least one projector 150 of the type described above with respect to FIGS. 8A-8D and processing chips (system on chip (SoC)) to implement the circuitry of FIG. 9 and to run complex algorithms such as those used to provide six degrees of freedom for augmented reality with hand tracking. In other words, the wearable electronic eyewear device 100 is designed to ensure that the electronic components are not thermally constrained for its primary feature set.

By accounting for the high power consumption when rendering more pixels to the display and using projections for the power consumption of the processing chips, the power consumption for features such as six degrees of freedom with hand tracking may be estimated as shown, for example, in Table 2.

system on chip power consumption may be moved backward toward the temples 110A-B and the hinged arms 125A-B by presenting different conduction paths, thereby maximizing heat dissipation and taking advantage of as much surface area of the wearable electronic eyewear device 100 as possible. Such a design is shown by way of example in FIG. 10.

Figure 10:
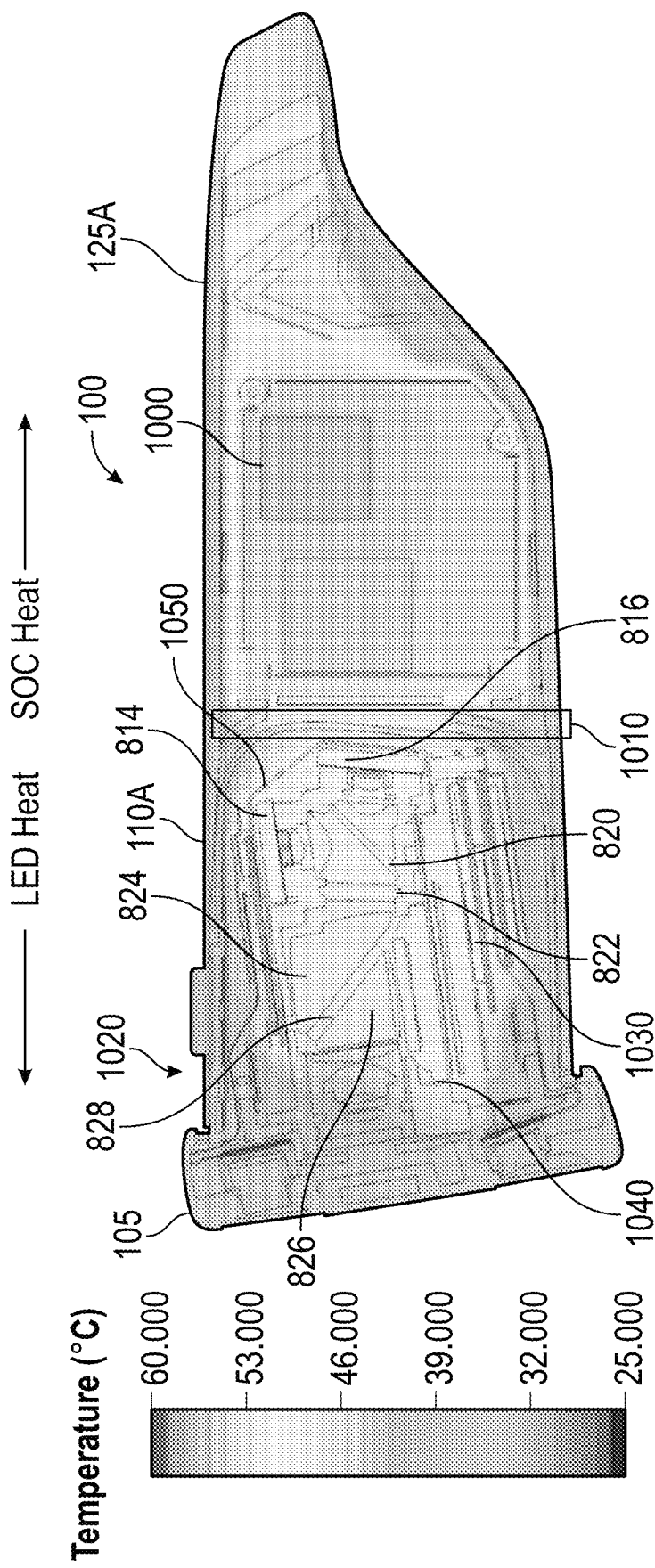
FIG. 10 illustrates a side view of a wearable electronic eyewear device optimized for thermal management whereby the display heat is moved forward to the frame and the heat generated by the system on chip is moved backward to the hinged arms, along with a corresponding heat map.

FIG. 10 illustrates a left side view of a wearable electronic eyewear device 100 optimized for thermal management whereby the display heat is moved forward in the temple 110A-B to the frame 105 and the heat generated by the system on chip 1000 is moved backward to the temples 110A-B and the hinged arms 125A-B, along with a corresponding heat map. A similar configuration may be provided on the right side of the wearable electronic eyewear device 100 and its description will be omitted to avoid redundancy.

As illustrated in FIG. 10, the temple 110A and the hinged arm 125A are separated by a thermally insulating gap such as an air gap 1010 at the position of the hinge 126A (not shown). In the case where the temples 110A-B do not include hinged arms 125A-B (e.g., the temples 110A-B do not fold), the air gap 1010 would be at a position between the display system 1020 and the system on chip 1000. This architecture allows the system on chip 1000 and the display system 1020 to effectively have two different thermal envelopes separated by the air gap 1010. Due to the air gap 1010, the two envelopes can be assessed in thermal isolation. Also, the system on chip 1000 may be divided into co-processors, one on each hinged arm 125A-B of the wearable electronic eyewear device 100 in order to further spread out the heat generating components to both hinged arms 125A-B. The separated thermal locations on the respective hinged arms 125A-B and the use of co-processors help to spread the heat dissipation over a larger area, which enables the thermal solutions to be optimized for both subsystems separately.

TABLE 2

Power Consumption Model for Six Degrees of Freedom AR with Hand Tracking

| | Six Degrees of Freedom AR with Hand Tracking | | | |
|---|---|---|---|---|
| Element | State of Art (mW) | State of Art (% of Power) | Estimate for New Design | New Design (5 of Power) |
| Cameras | 340 | 10.8% | 160 | 4.2% |
| System on Chip | 1,463 | 46.5% | 838 | 22.0% |
| Displays | 1,296 | 41.2% | 2,762 | 72.5% |
| Other | 50 | 1.5% | 50 | 1.3% |
| System Total | 3,149 | 100% | 3,810 | 100% |

It is noted that larger field of view displays increase the display subsystem power consumption substantially (e.g., from 1,296 mW for 25° displays to 2,762 mW for 46° displays). When the larger field of view displays are used, they become the largest power consumer in the wearable electronic eyewear device 100 and may account for more than 70% of the power discharged for features such as six degrees of freedom augmented reality with hand tracking.

To counter the impact of the larger power consumption by the larger field of view displays, the wearable electronic eyewear device 100 may be designed to isolate the heat generated by the system on chip components from the heat generated by the display components. Rather than coupling the power of both subsystems together by "wrapping" the system on chip electronics around the projector 150, the display subsystem power consumption may be moved forward in the temple 110A-B to the front frame 105, while the As further illustrated in FIG. 10, the display subsystem 1020 may include four main heat generating components: the display driver integrated circuit (DLP driver IC) 1030, the display digital micromirror device (display DMD) 1040 that produces the image, and the light emitting diodes (LEDs) 814, 816 used to illuminate the display, including the green LED 816 and the red/blue LED 814. The LEDs 814, 816 are the biggest contributor to the system power and are the most impacted by the brightness of the indoor/outdoor ambient environment on the desired display brightness. For example, it is estimated that the indoor projector LED power consumption is approximately 27% of the power required for outdoor use. Increasing the digital field of view from 25° to 46° (3.6× increase in area) may require up to 2.9× more LED power to maintain the desired brightness for outdoor use. To compensate for the additional power consumption, the heat may be more evenly distributed by using a 2 LED system including a separate red/blue (combined) LED 814 and green LED 816 instead of a single RGB LED. FIGS. 8A-8D show sample configurations including a separate red/blue LED 814 and green LED 816.

Figure 11A:
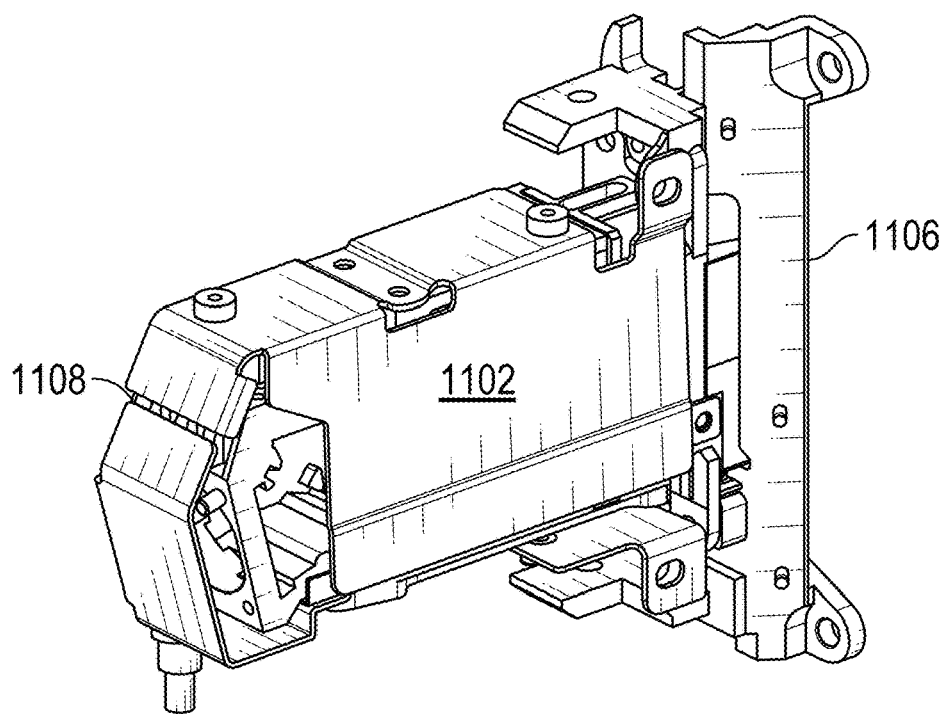
FIG. 11A and FIG. 11B illustrate the two separated heat sinks enclosing a projector in a sample thermal management configuration.
Figure 11B:
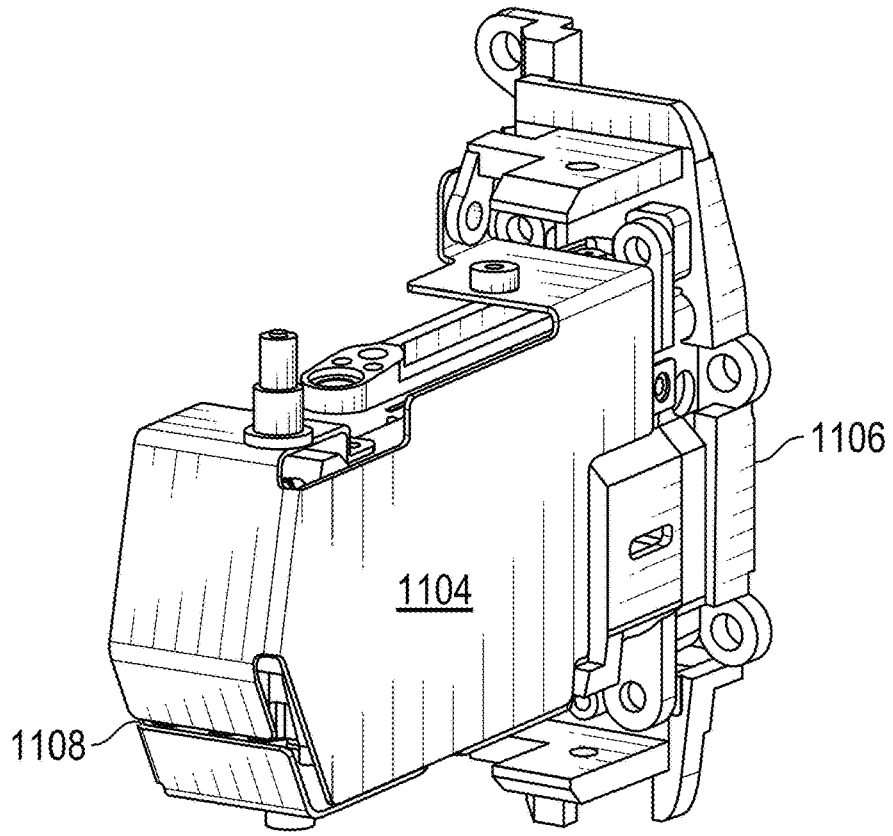

Approximately 30% of the electrical power that is input into the LEDs 814, 816 is converted to light, while the remaining 70% is dissipated as heat. To dissipate and spread the heat, each LED 814, 816 is soldered directly into a copper heat sink 1050, thereby reducing the LED 814, 816 component temperature. Moving the heat forward to the front frame 105 of the wearable electronic eyewear device 100 and away from the system on chip 1000 may be accomplished by using two additional heat sinks designed to present a conduction path to the adapter as shown in FIGS. 11A and 11B. As noted above, the heat sinks of FIGS. 11A and 11B are separated from the thermal envelope for the system on chip 1000 by the air gap 1010.

During operation, both the projector 150 of the display system 1020 and the system on chip 1000 generate significant amounts of heat. This heat needs to be mitigated such that the wearable electronic eyewear device 100 can be safely and comfortably operated. In addition, the projector 150 radiates noise that falls into wireless bands, such as GPS and WI-FI®.

FIG. 11A and FIG. 11B illustrate a pair of thermally and physically isolated heat sinks 1102 and 1104 configured to encompass projector 150. Heat sink 1102 is physically and thermally coupled to the red/blue LED 814 on one side of the projector 150 (and potentially the light controller 829 and power) and is configured to sink heat from the red/blue LED 814 to the frame 105. The heat sink 1104 is physically and thermally coupled to the other side of the projector 150 and is configured to sink heat from the green LED 816 and other components to at least one of the frame 105 and the temples 110A-B. Each of the heat sinks 1102 and 1104 is coupled at a respective proximal end to an adapter 1106, which may or may not be thermally conductive depending on the thermal design. In one example, the heat sinks 1102 and 1104 may be comprised of copper or other highly thermally conductive material. The heat sinks 1102 and 1104 are physically and thermally separated from each other by air. A thermal interface material (TIM) 1108, such as Fujipoly® manufactured by Fujipoly of Carteret, New Jersey, with a k=13 W/m-k gap pad may be disposed between the heat sinks 1102 and 1104 and LEDs 814 and 816 to thermally couple the heat sinks 1102 and 1104 to the respective LEDs 814 and 816. The heat sink 1102 and the heat sink 1104 may be parallel to each other, and on opposing sides of the projector 150, to help thermally isolate them from one another. The heat sinks 1102 and 1104 are physically and thermally separated based on their shapes and mounting locations.

In sample configurations, the thermally and physically isolated heat sinks 1102 and 1104 sink heat to the frame to significantly reduce the heat generated in the wearable electronic eyewear device 100. For instance, the heat sink 1102 coupled to the red/blue LED 814 is thermally connected to the frame 105 and sinks heat in a forward direction, while the heat sink 1104 may be coupled to the green LED 816 and to a different portion of the frame 105 to sink heat to the different portion of the frame 105. Alternatively, the heat sink 1104 may be connected to the temple 110A-B to sink heat in a rearward direction away from the frame 105.

Figure 12A:
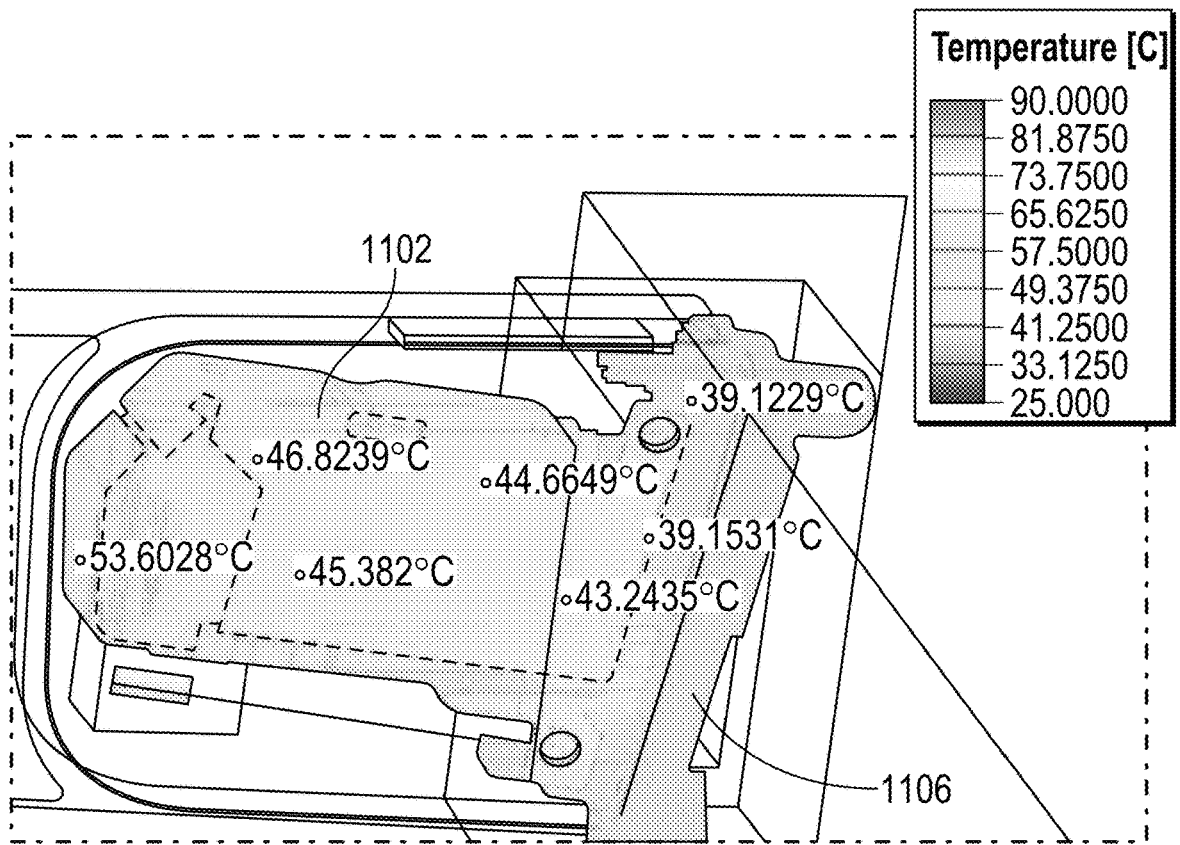
FIG. 12A and FIG. 12B illustrate the heat performance of the heat sinks of FIG. 11A and FIG. 11B.
Figure 12B:
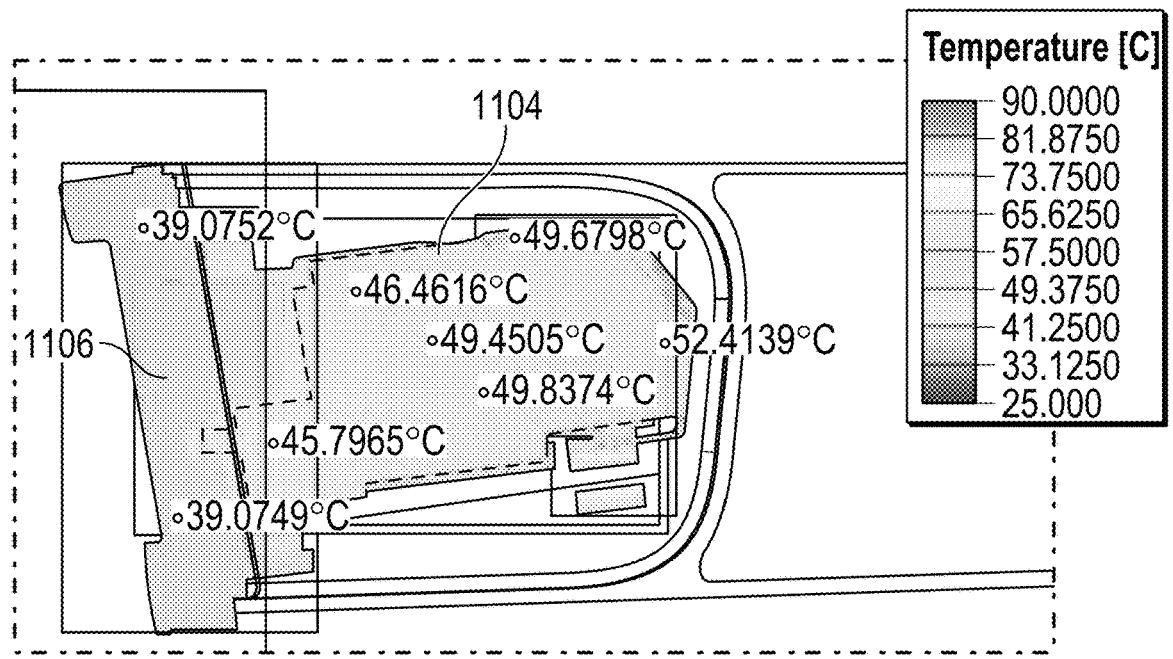

FIG. 12A and FIG. 12B illustrate the heat sinking performance of heat sink 1102 and heat sink 1104 during operation of the projector 150, respectively. As seen in FIG. 12A and FIG. 12B, heat is evenly spread throughout the heat sinks 1102 and 1104, and heat is much lower in the adapter 1106. The heat sinks 1102 and 1104 that encompass the projector 150 also trap the RF electromagnetic energy generated by the projector 150, and thus prevent electromagnetic interference (EMI). The heat sinks 1102 and 1104 prevent EMI interference with other wireless systems, such as those of the wearable electronic eyewear device 100, and external systems that operate in the vicinity.

Figure 13:
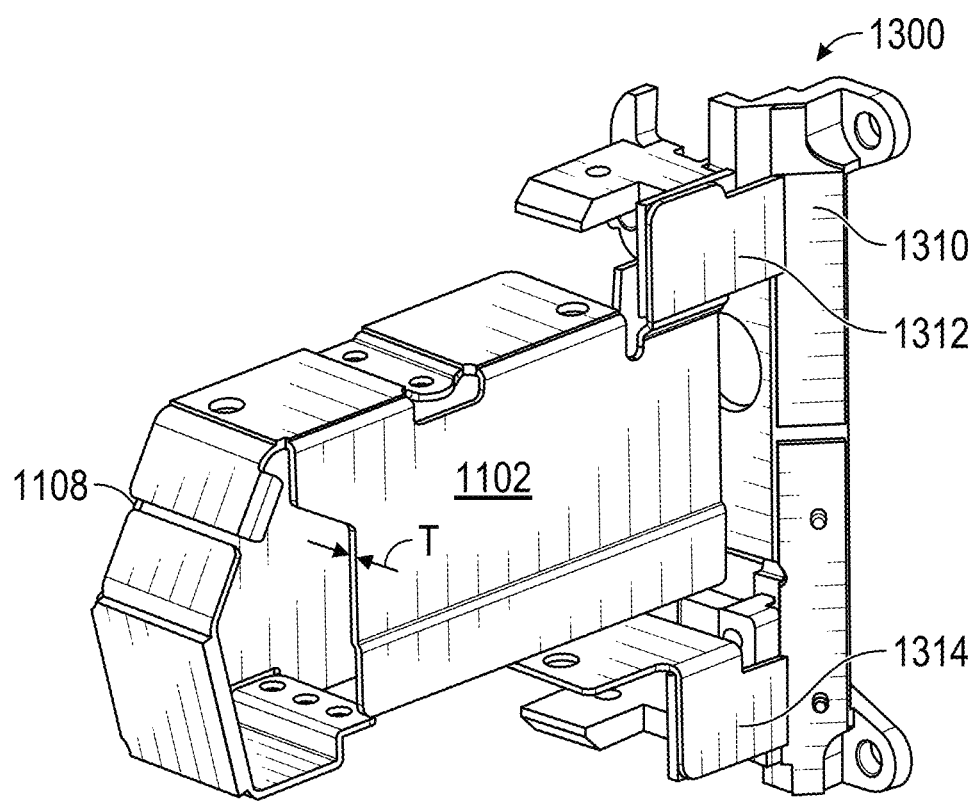
FIG. 13 illustrates another example of a heat sinks and the adapter.

FIG. 13 illustrates another example of an adapter 1300 having a first planar surface 1310 and a web portion 1312 of the heat sink 1102 that is thermally and physically coupled to the first planar surface 1310. The adapter 1300 also has a second planar surface 1314 that is physically and thermally isolated from the first planar surface 1310 such that the heat generated by the respective heat sinks 1102 and 1104 can be thermally directed away from each other as previously described. For example, the first planar surface 1310 may be thermally coupled to the frame 105, and the second planar surface 1314 may be thermally coupled to another portion of the frame 105 or to the temple 110A-B. With respect to the heat sink 1102 that is coupled to the red/blue LED 814, the thickness "T" of the heat sink 1102 may be thicker proximate the LED 814 than at other portions of the sink 1102 for improved thermal conductivity.

Figure 14A:
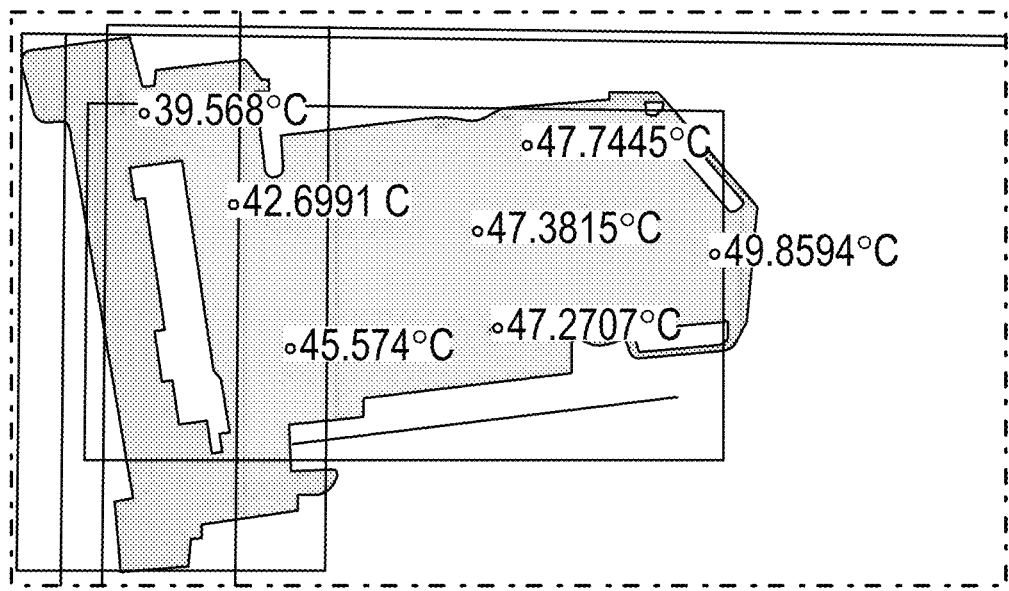
FIG. 14A and FIG. 14B illustrate the heat performance of the heat sink of FIG. 13.
Figure 14B:
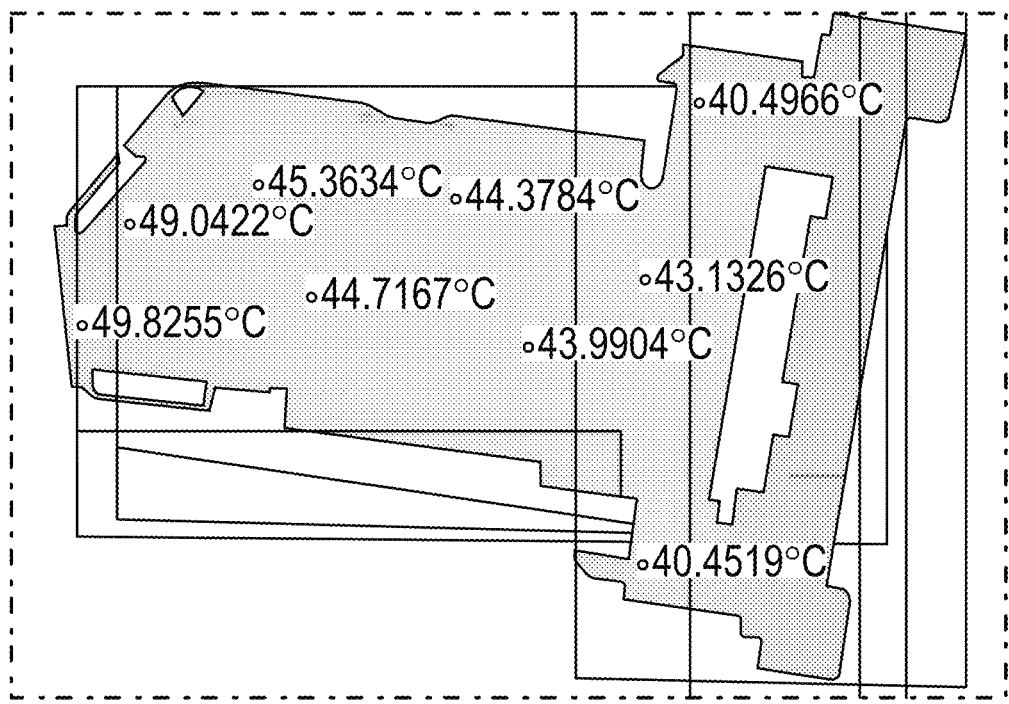

FIG. 14A and FIG. 14B illustrate the improved heat sinking performance of heat sink 1102 and heat sink 1104 during operation of the projector 150, respectively. As in FIG. 12A and FIG. 12B, heat is evenly spread throughout the heat sinks 1102 and 1104, and heat is much lower in the adapter 1300.

Figure 15:
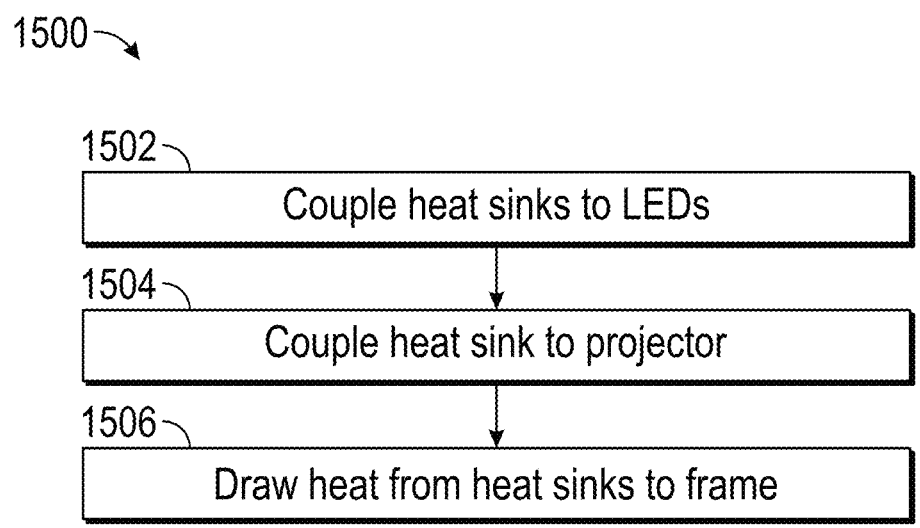
FIG. 15 illustrates a method of operating the projector with the heat sinks of FIG. 11A, FIG. 11B, and FIG. 13.

FIG. 15 illustrates a method 1500 of operation of the heat sinks 1102 and 1104 in a sample configuration.

At block 1502, the first heat sink 1102 is physically and thermally coupled to the red/blue LED 814 and the second heat sink 1104 is physically and thermally coupled to the green LED 816. Each of the LEDs 814, 816 may be coupled to the heat sinks 1102/1104 by thermal interface material.

At block 1504, the second heat sink 1104 is physically and thermally coupled to the other side of the projector 150. The projector 150 may be coupled to the sink 1104 by a thermal interface material.

At block 1506, the heat generated by the LEDs 814 and 816 is drawn into the heat sinks 1102 and 1104 and directed forwardly in the wearable electronic eyewear device 100, such as to frame 105. The heat generated by LEDs 814 and 816 and other electrical components of the projector 150 may be directed into another portion of the frame 105 or may be directed rearwardly in the wearable electronic eyewear device 100 to the temple 110A-B. Each of the heat sinks 1102 and 1104 sufficiently sink heat away from the respective heat generating components such that the wearable electronic eyewear device 100 is comfortably cool to the user during operation of the projector 150.

Figure 16:
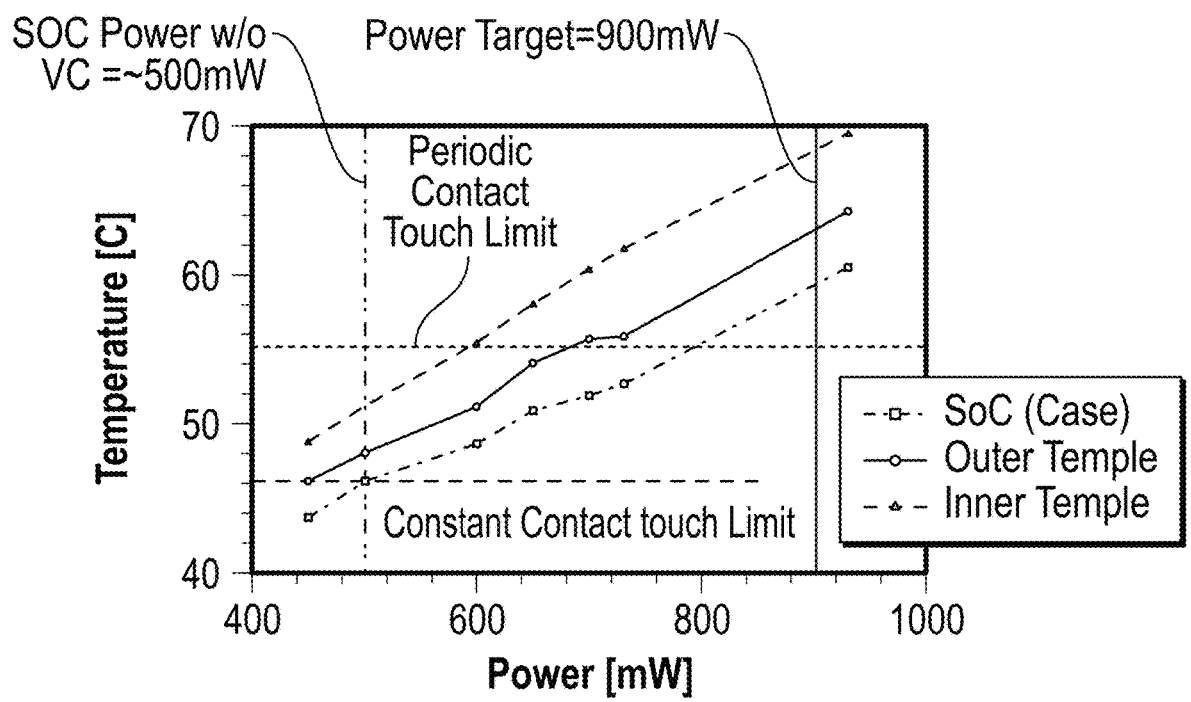
FIG. 16 illustrates the power consumption of the system on chip relative to touch temperature limits without thermal management.

Separating the system on chip 1000 from the projector 150 and front frame 105 results in more thermal envelope for the display system 1020 but may reduce the thermal envelope of the system on chip 1000. This presents its own challenge as the smaller envelope for the system on chip 1000 limits the power dissipation to, for example, 500 mW to avoid excessive heating. As shown in the graph of FIG. 16, this is meaningfully lower than the 900 mW target estimated to support six degrees of freedom and hand tracking. FIG. 16 also illustrates that the power consumption of the system on chip 1000 may exceed the touch temperature limits without taking further measures to improve the heat dissipation.

To address this issue, a thermal management component including a vapor chamber 1700 may be provided to more effectively spread the heat dissipated from the system on chip 1000 over a larger surface area. In sample configurations, the vapor chamber 1700 has three parts: a vacuum sealed enclosure including top and bottom covers 1702 and 1704, a wicking structure including top and bottom wicking components 1706 and 1708, and a working fluid. The sealed vacuum enclosure may be a copper enclosure formed of covers 1702 and 1704 with a sintered copper wick structure including wicking components 1706 and 1708 that bond to the interior surface of the copper enclosure. De-ionized water may be used as the working fluid.

Figure 17:
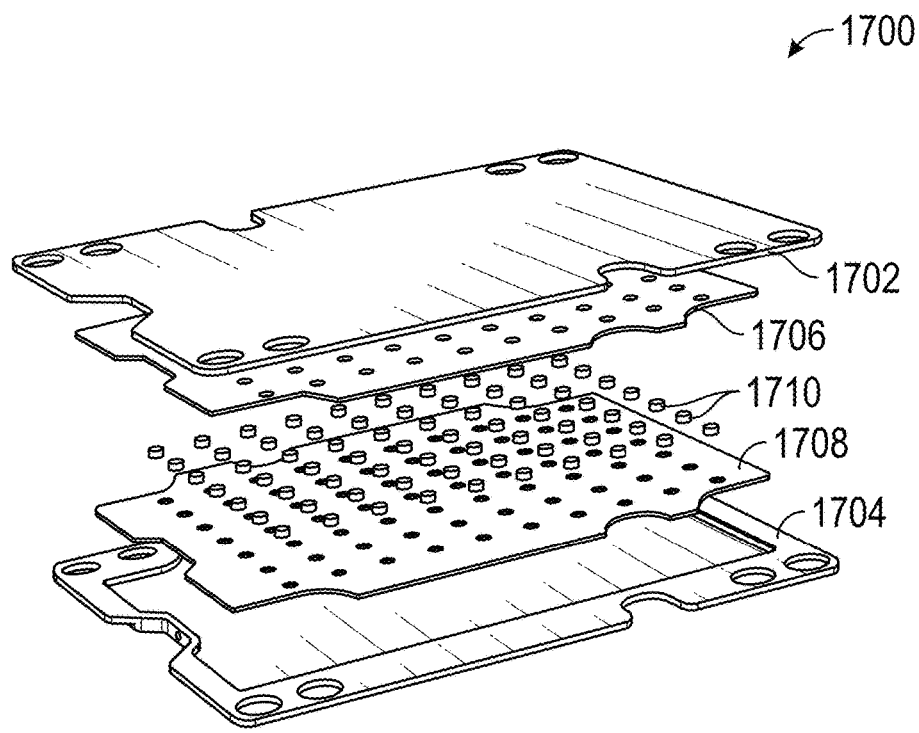
FIG. 17 illustrates a sample configuration of the components of a vapor chamber, including top and bottom covers, top and bottom wicking structures, and copper pillars, for managing excess heat from the electronic components.

FIG. 17 shows a sample configuration of the components of the vapor chamber 1700, including the top and bottom covers 1702 and 1704, the top and bottom wicking structures 1706 and 1708, and copper pillars 1710 that separate the wicking structures 1706 and 1708. A vapor chamber 1700 so constructed has an evaporator side and a condensing side. As heat is applied, some of the liquid turns to vapor (the evaporator side) and travels to an area of lower pressure (the condenser side). The condenser side allows the vapor to cool and return to a liquid. The liquid is then absorbed by the wicking structure and transported back to the evaporator side via capillary action.

Ultimately, the working fluid within the vapor chamber 1700 acts to effectively distribute heat across the body of the wearable electronic eyewear device 100 so as to maintain, for example, less than a 5° C. temperature rise across the wearable electronic eyewear device 100. As a result, the heat from the system on chip 1000 may be moved throughout the hinged arm 125 A-B and the surface area maximized from which heat can be dissipated to the ambient environment. This additional surface area may further smooth hot spots and alleviate possible touch temperature challenges that could otherwise develop.

Figure 18A:
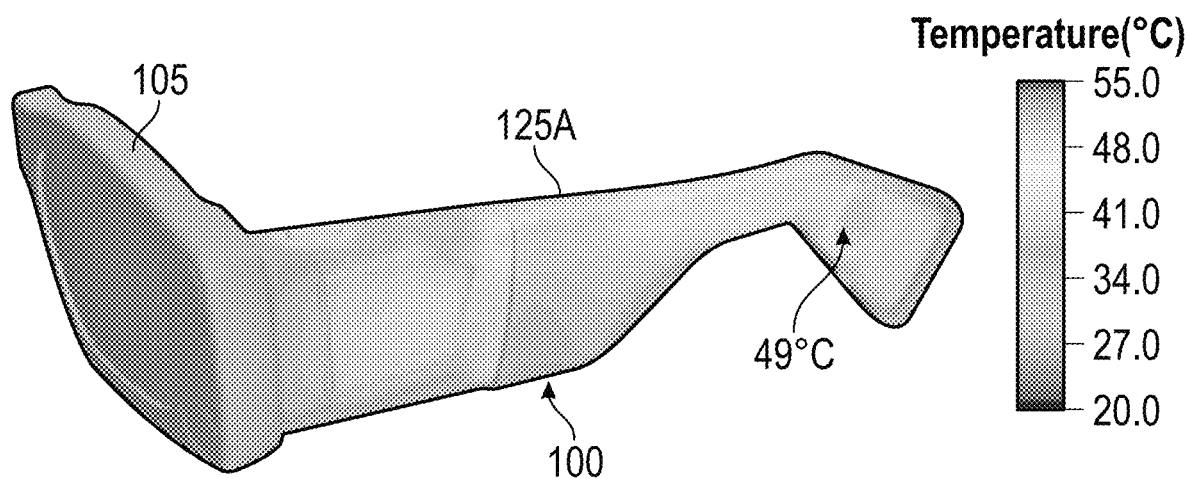
FIGS. 18A and 18B illustrate a heat map for front and rear perspective views, respectively, of a wearable electronic eyewear device with thermal management, including a system on chip that generates 1.5 W evenly distributed across the hinged arm, with a maximum rise of 4° C. across the hinged arm.
Figure 18B:
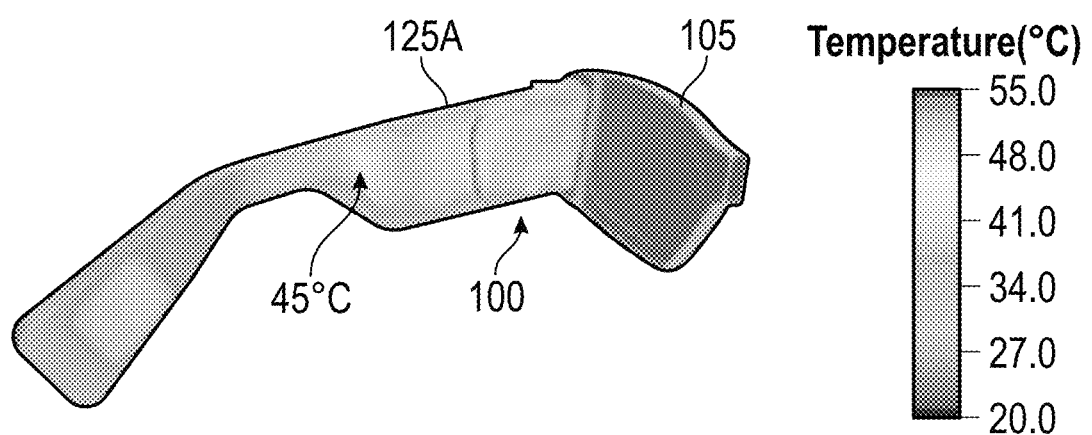

FIGS. 18A and 18B illustrate a heat map for front and rear perspective views, respectively, of a wearable electronic eyewear device 100 including a system on chip 1000 that generates 1.5 W evenly distributed across the hinged arm 125A using the vapor chamber 1700, with a maximum rise of 4° C. across the hinged arm 125A.

Figure 19A:
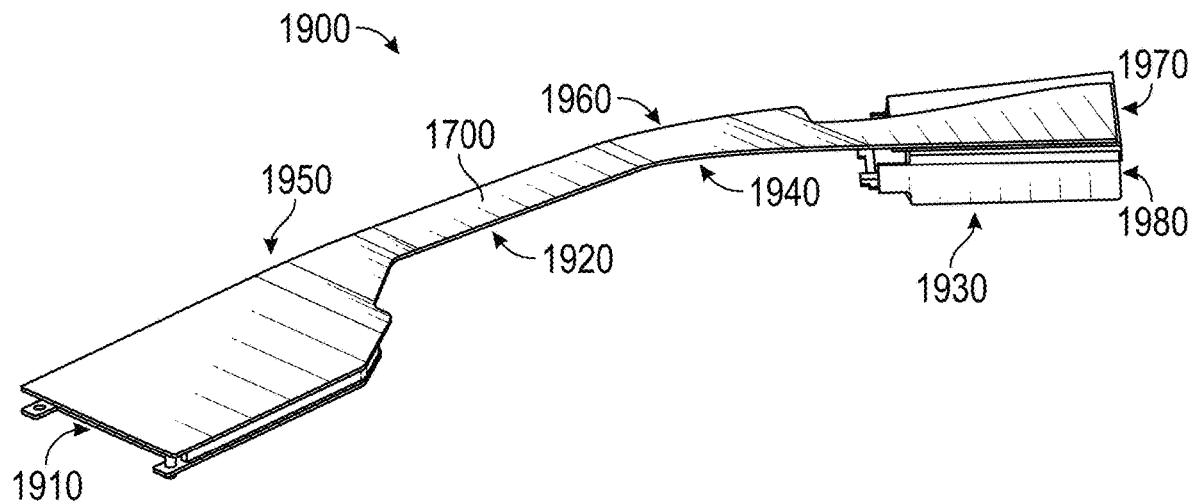
FIG. 19A illustrates a perspective view of a thermal management device for the system on chip of the electronic eyewear device of FIG. 10 in accordance with an example.
Figure 19B:
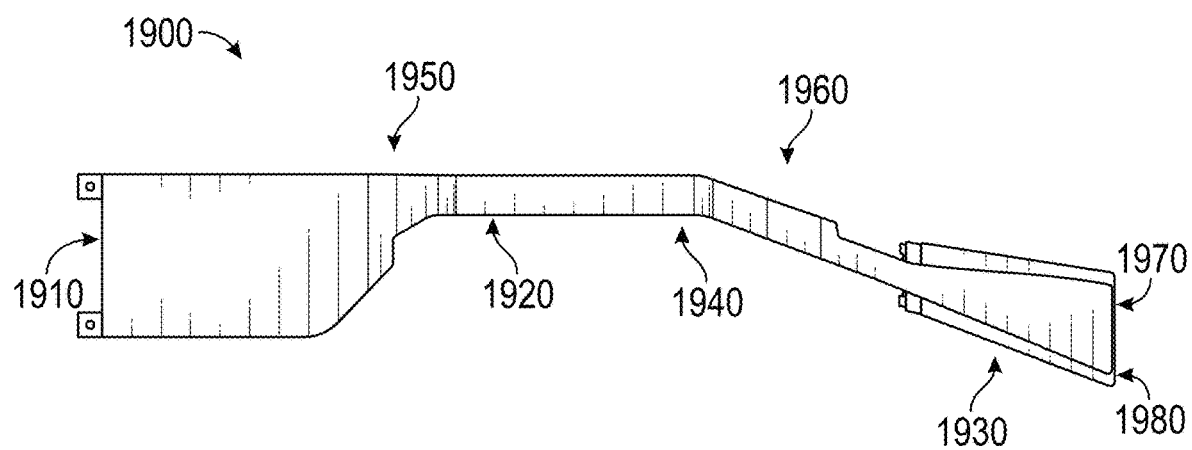
FIG. 19B illustrates a top plan view of the thermal management device of FIG. 19A.

FIGS. 19A and 19B show an example thermal management device 1900 incorporating a vapor chamber 1700 for managing excess heat generated by the system on chip 1000 and other electronic components to maintain normal operation of the wearable electronic eyewear device 100 by dissipating the generated heat across the entirety of the hinged arm 125A. It will be appreciated that another thermal management device 1900 also may be provided within the other hinged arm 125B to dissipate heat generated by a system on chip 1000 including a co-processor and other electronic components disposed within the other hinged arm 125B. The onboard electronic components, which are substantially housed within compartment 1910 produce heat and comprise heat source 2000 (see FIGS. 20A and 20B), which may be, for example, a co-processor for executing instructions during a user experience. Thermal management device 1900 may include thermal coupling 1920 and heat sink 1930 that dissipate heat produced by heat source 2000. Thermal coupling 1920 is in thermal communication with the heat source 2000 and is sized to be received within the hinged arm 125A-B. The thermal coupling 1920 is also sized to extend through a substantial portion of the hinged arm 125A-B to maximize the surface area for heat transfer and extends forward to a widened section of the hinged arm 125A-B near the hinge 126A-B (not shown) for incorporating compartment 1910 and rearward through the hinged arm 125A-B to an angled portion 1940 corresponding to the approximate area where the hinged arm 125A-B would contact the user's ear when worn. In some examples, the thermal coupling 1920 comprises first and second sections 1950, 1960. In some examples, the first and second sections 1950, 1960 are physically separate, or are functionally separate based on coatings or other materials or other treatments or structures that alter their respective physical properties, for example, conductivity.

In some examples, the thermal coupling 1920 may comprise a two-phase vapor chamber 1700 of the type described above with respect to FIG. 17. The vapor chamber 1700 may be at least partially located within the first section 1950 of the thermal coupling 1920. In some examples, the vapor chamber 1700 is in thermal communication with at least one thermal spreader 2200 (see FIGS. 22A and 22B), for example, a conductive coating or pre-manufactured layer. In some examples, a layer of thermal interface material (TIM) 2010 (FIGS. 20A and 20B) may be interposed between the thermal spreader 2200 and the vapor chamber 1700. The thermal coupling 1920 further extends at least partially to heat sink 1930 and, in the illustrated example in FIGS. 19A and 19B, extends to heat sink 1930.

Thermal management device 1900 further includes heat sink 1930. Heat sink 1930 can be any thermally conductive structure having lower thermal environment relative to the heat source 2000. In some examples, the heat sink 1930 is positioned at a second portion of the body of the wearable electronic eyewear device 100, including, for example, the ear portion 1970 of the hinged arm 125A-B. In one example, the heat sink 1930 may include a battery shield 1980 proximate to a battery 2100 (FIG. 21A) used for powering the onboard electrical components. The battery shield 1980 may be at any position within the hinged arm 125A-B but, in the example shown in FIGS. 19A and 19B, is located in the ear portion 1970 near the end of the hinged arm 125A-B.

Figure 20A:
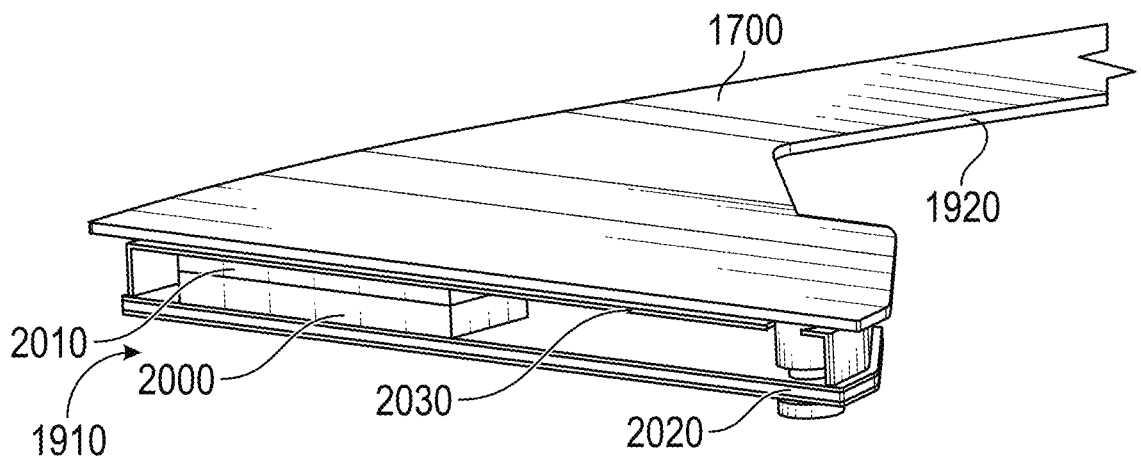
FIG. 20A illustrates a perspective view of one end of the thermal management device of FIGS. 19A and 19B in accordance with an example.
Figure 20B:
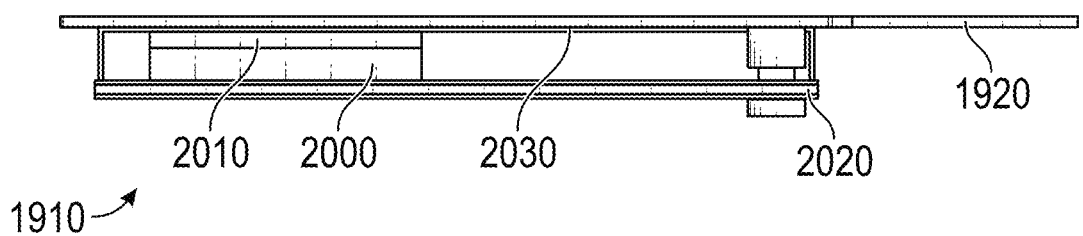
FIG. 20B illustrates an end elevation view of FIG. 20A.
Figure 20C:
FIG. 20C illustrates a configuration of the thermal management device of FIG. 20A in which the heat sink and the second TIM layer are omitted such that the vapor chamber is positioned adjacent to the heat source.

FIGS. 20A and 20B are views of the end of compartment 1910 showing the heat source 2000 in detail in relation to the thermal coupling 1920. As shown, an electrical component 2020 (e.g., a printed circuit board) is adjacent to the heat source 2000 that draws heat from the component. In this example, the heat source 2000 is in further thermal communication with a shield can 2030 with an interspersed layer of thermal interface material (TIM) 2010 to facilitate heat transfer. A second layer of TIM (not shown) may be provided to further dissipate heat toward the thermal coupling 1920. As noted above, in some examples the thermal coupling 1920 includes a vapor chamber 1700. As shown in FIG. 20C, in some examples the shield can 2030 and the second TIM layer may be omitted such that the vapor chamber 1700 of the thermal coupling 1920 is positioned adjacent to the heat source 2000.

Figure 21A:
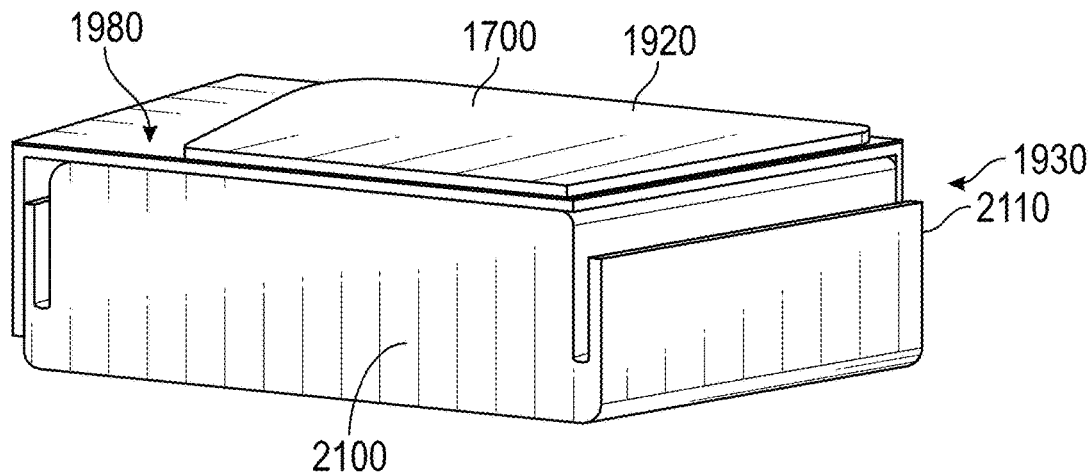
FIG. 21A illustrates a perspective view of a heat sink shown in FIG. 19A in accordance with an example.
Figure 21B:
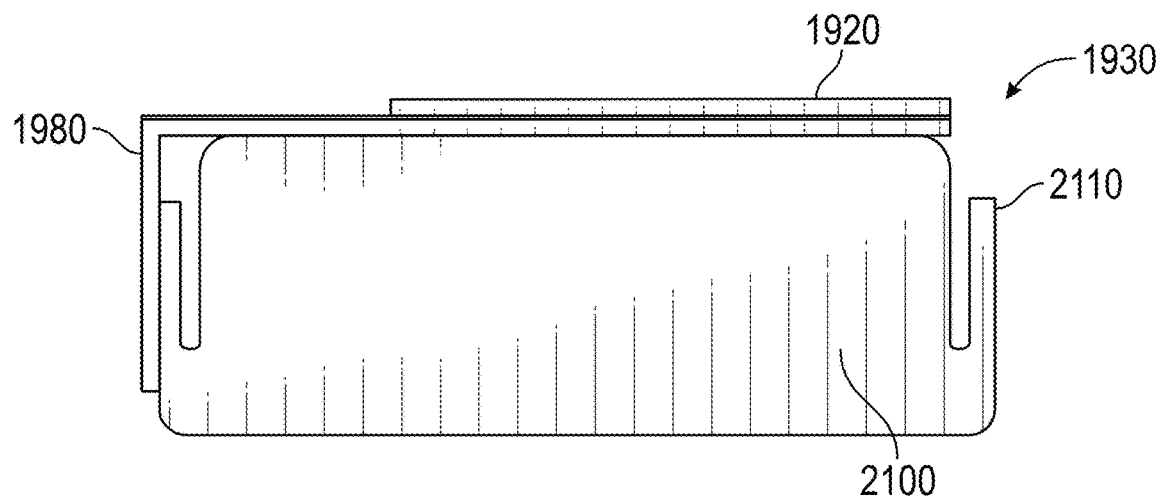
FIG. 21B illustrates an end elevation view of the heat sink of FIG. 21A.

FIGS. 21A and 21B illustrate an example heat sink 1930 of FIGS. 19A-19B in further detail. These views show that the thermal coupling 1920 at least partially contacts heat sink 1930. As illustrated, heat sink 1930 includes a battery shield 1980 at least partially enclosing a battery 2100. The battery shield 1980 comprises a conductive material which receives thermal energy from thermal coupling 1920. In some examples, the battery shield 1980 can include extended surfaces 2110 that increase the surface area contacting air. As shown, the thermal coupling 1920 may include a vapor chamber 1700 extending from the end of the hinged arm 125A-B including compartment 1910 to the end including the heat sink 1930. The thermal coupling 1920 may be affixed directly to the battery shield 1980 or may include an intermediate TIM layer to facilitate heat transfer. In some examples, the thermal coupling 1920 may contact the battery 2100 directly. In other examples, thermal coupling 1920 may contact battery 2100 through a TIM layer.

Figure 22A:
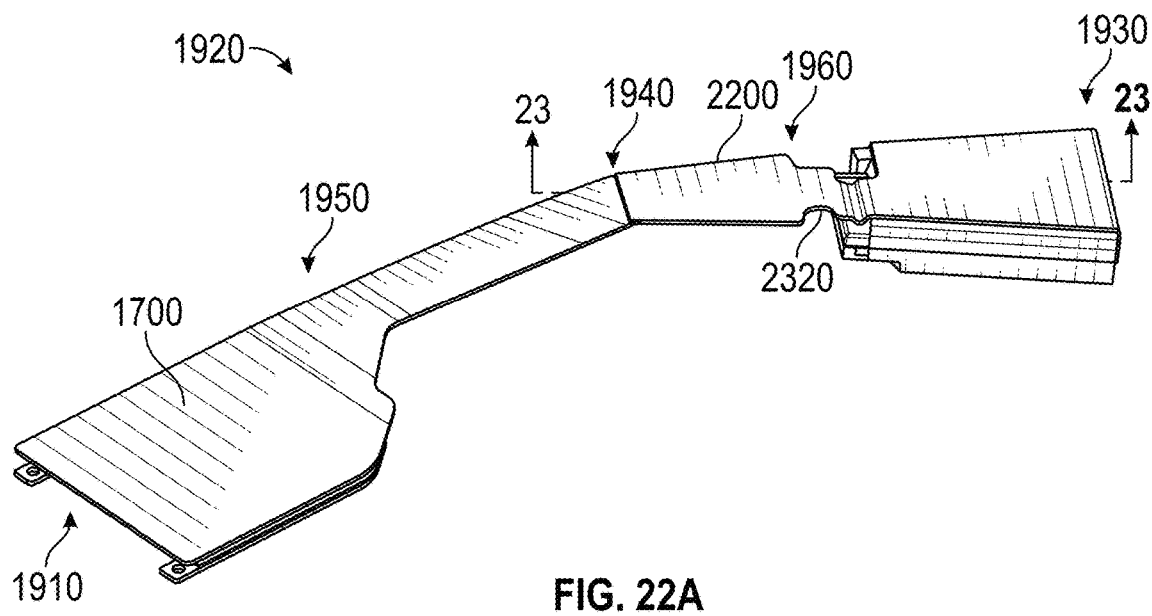
FIG. 22A illustrates a perspective view of a thermal management device in accordance with another example.
Figure 22B:
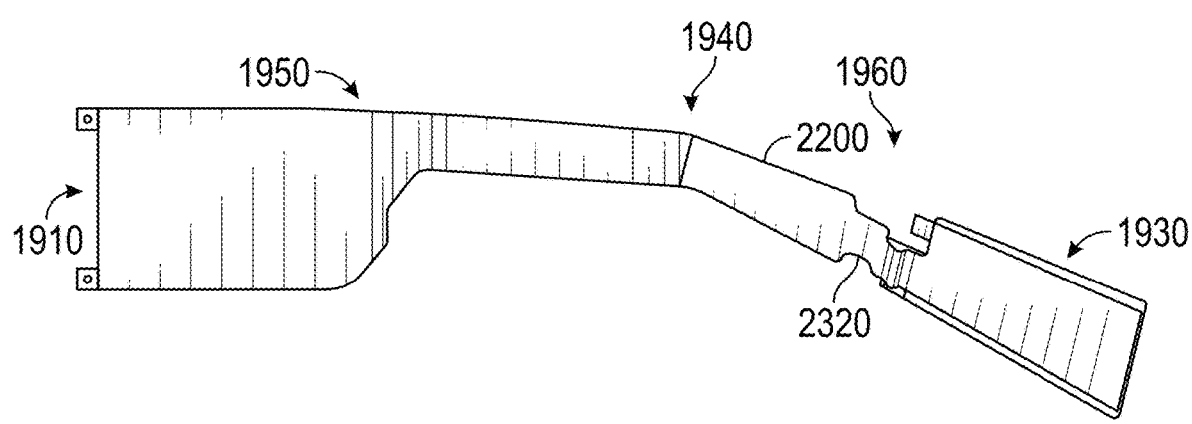
FIG. 22B illustrates a top plan view of the thermal management device of FIG. 22A.

FIGS. 22A and 22B illustrate an example configuration of thermal coupling 1920 comprising first and second sections 1950, 1960, where the first section 1950 comprises a vapor chamber 1700 and the second section 1960 comprises a thermal spreader 2200, and the first and second sections 1950, 1960 are in thermal communication and, as shown, are in direct contact, but may consist of a vapor chamber 1700 with or without a thermal spreader 2200 affixed or coating the vapor chamber 1700. Also, as shown, the thermal spreader 2200 may be attached to a carrier 2210 (FIG. 23) that is in turn connected to the heat sink 1930. The thermal spreader 2200 can be any suitable conductive material. In some examples, the thermal spreader 2200 is graphite or a graphite composite. In an example, the thermal spreader 2200 may be graphite on a plastic film carrier. In some examples, the carrier 2210 may be a conductive material or composite. In some examples, the carrier 2210 provides a support for the thermal spreader 2200, while in other examples the carrier 2210 provides support for the thermal spreader 2200 but is itself a conductive material to further transfer thermal energy away from the onboard electronic components. In various examples, the carrier 2210 is a plastic or a metal or a metallic composite. In some examples, the carrier 2210 is made of aluminum.

Figure 23:
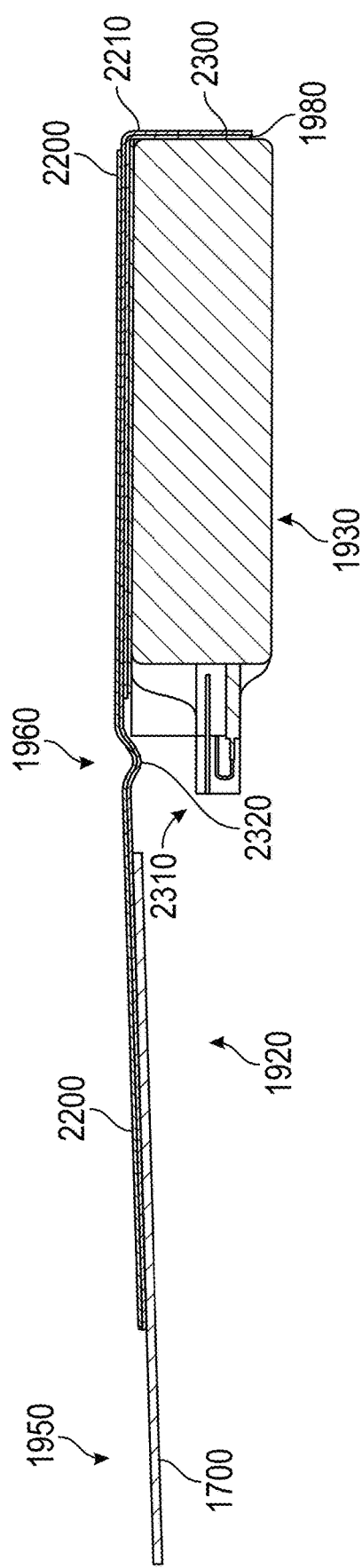
FIG. 23 illustrates a sectional view along line 23-23 of FIG. 22A.

FIG. 23 illustrates a partial sectional view taken along line 23-23 of FIG. 22A. FIG. 23 illustrates further detail of the connection of the thermal coupling 1920, including the attachment of the carrier 2210 to the vapor chamber 1700 and to the battery shield 1980 so as to maintain the thermal communication of the vapor chamber 1700 to the heat sink 1930. The first section 1950 is partially shown where vapor chamber 1700 is in view. Thermal spreader 2200 and its carrier 2210 are also shown. The thermal spreader 2200 is connected, adhered, or otherwise affixed to the vapor chamber 1700. Carrier 2210 is affixed to vapor chamber 1700 to carry thermal energy from the vapor chamber 1700 to the thermal spreader 2200 to the heat sink 1930. As illustrated, the perimeter of the thermal spreader 2200 substantially conforms to the perimeter of the battery shield 1980 along its top surface as also shown in FIG. 22, but in some examples, the carrier 2210 may at least partially contact other surfaces of the battery shield 1980 such as battery shield end 2300, or in some examples, the battery 2100 directly. The thermal spreader 2200 and carrier 2210 also may include a gap area 2310 that does not include the vapor chamber 1700 but may include a service loop 2320 for applications in which the hinged arms 125A-B may bend in the gap area 2310. In one example, the thermal spreader 2200 includes a graphite spreader with a plastic film carrier. In another example, the thermal spreader 2200 is affixed to carrier 2210.

Figure 24:
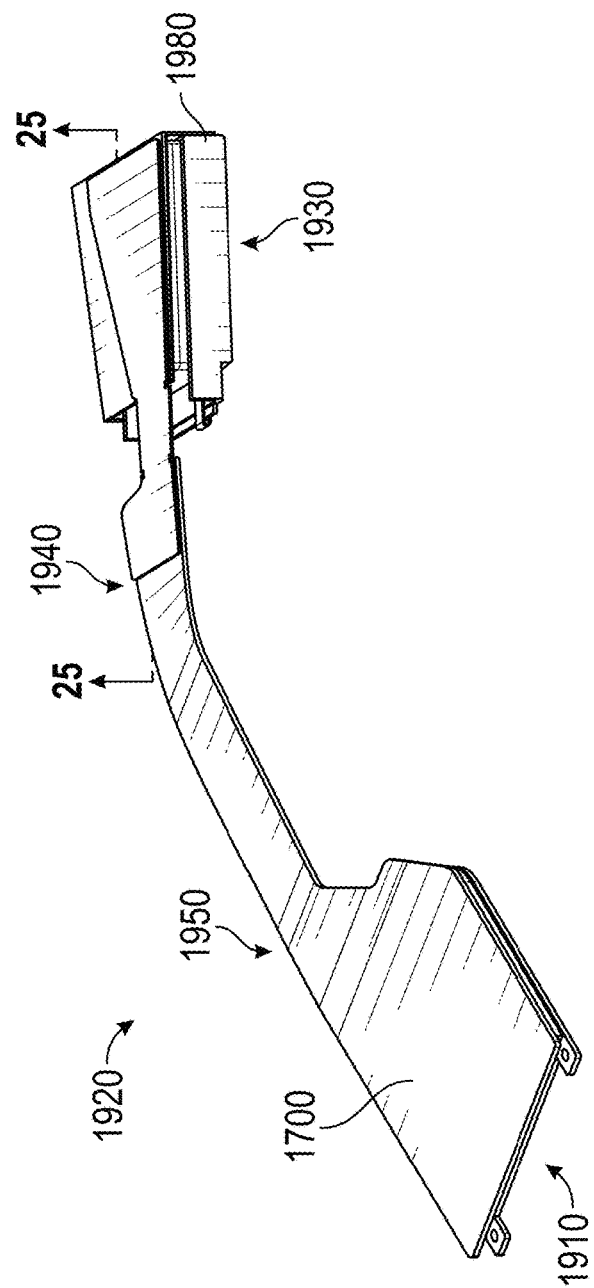
FIG. 24 illustrates a perspective view of another configuration of the thermal management device in accordance with an example.
Figure 25:
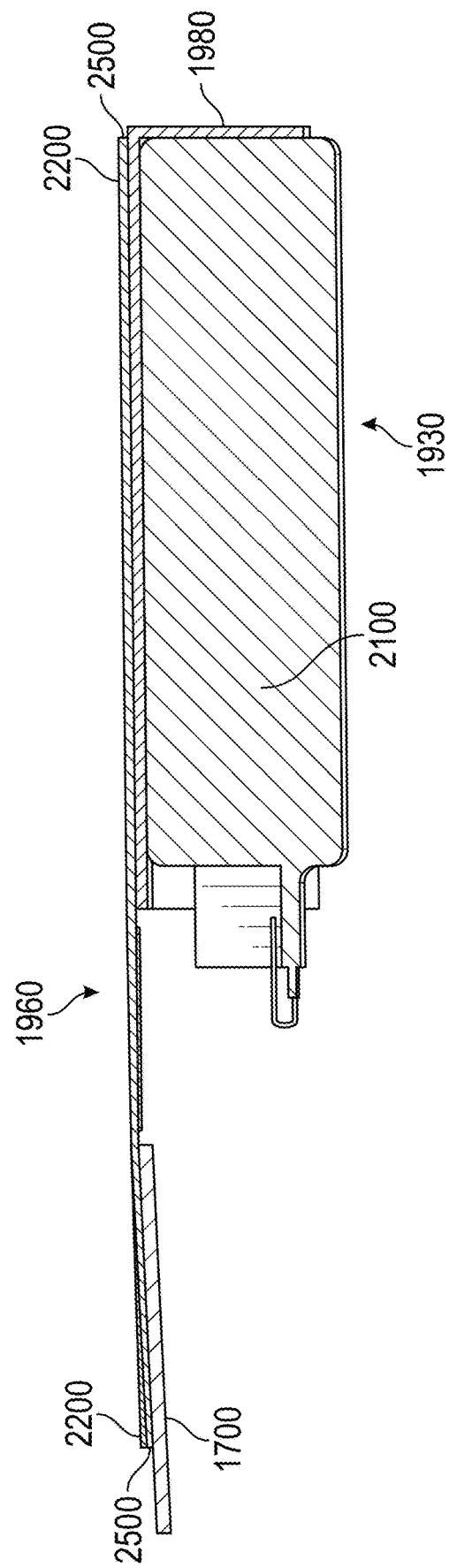
FIG. 25 illustrates a sectional view along line 25-25 of FIG. 24.

As shown in FIGS. 24 and 25, carrier 2210 may be composed of one or more metals (for example, aluminum) or metal composites and may include a thermal interface material layer 2500 between at least a portion of the thermal spreader 2200 and a portion of the vapor chamber 1700 or thermal spreader 2200. As shown, the heat sink 1930 includes a metallic battery shield 1980 that allows thermal energy to dissipate from the vapor chamber 1700 and thermal spreader 2200.

FIG. 24 illustrates an example configuration where the thermal coupling 1920 extends between the heat source 2000 and heat sink 1930. The thermal coupling 1920 comprises vapor chamber 1700, carrier 2210, thermal spreader 2200, and heat sink 1930. In one aspect, the carrier 2210 is wrapped with the thermal spreader 2200. The vapor chamber 1700 is sized to be received in a cavity of the hinged arm 125A-B in or near the compartment 1910 to maximize surface area for heat transfer and extends rearward through the hinged arm 125A-B to an angled portion 1940 corresponding substantially to where the hinged arm 125A-B is angled approximately where it would contact the user's ear when worn. At the angled portion 1940, heat is transferred from the vapor chamber 1700 to the carrier 2210. In some examples, the carrier 2210 is metal, metallic, or a metal alloy or composite, and in a particular example, substantially comprises aluminum. The carrier 2210 may be at least partially enveloped by the thermal spreader 2200 (e.g., heat transfer material) by coating, wrapping, affixing, etc. In one example, the thermal spreader 2200 is graphite, which may be coated on the carrier 2210 or adhered and may include a plastic backing. The carrier 2210 contacts the heat sink 1930, and as illustrated in FIG. 24, may be a battery shield 1980 to dissipate the thermal energy generated by the onboard electronics. In this example, the thermal margin is increased by about 60%. In some examples, the thermal margin is increased by 55% to 65%. In other examples, the thermal margin is increased between 60% and 70%. The heat sink 1930 also may include additional sections of conductive material to facilitate heat transfer.

FIG. 25 is a partial sectional view taken along line 25-25 of the thermal coupling 1920 illustrated in FIG. 24. FIG. 25 illustrates the connection of the thermal spreader 2200 to the vapor chamber 1700 and the battery shield 1980 and in particular shows the example of a metal or metal composite carrier and a thermal interface material layer 2500 between at least a portion of the thermal spreader 2200 and a portion of the vapor chamber 1700 or thermal spreader 2200. The heat sink 1930 includes a conductive battery shield 1980 that allows thermal energy to dissipate from the vapor chamber 1700 and thermal spreader 2200.

Figure 26A:
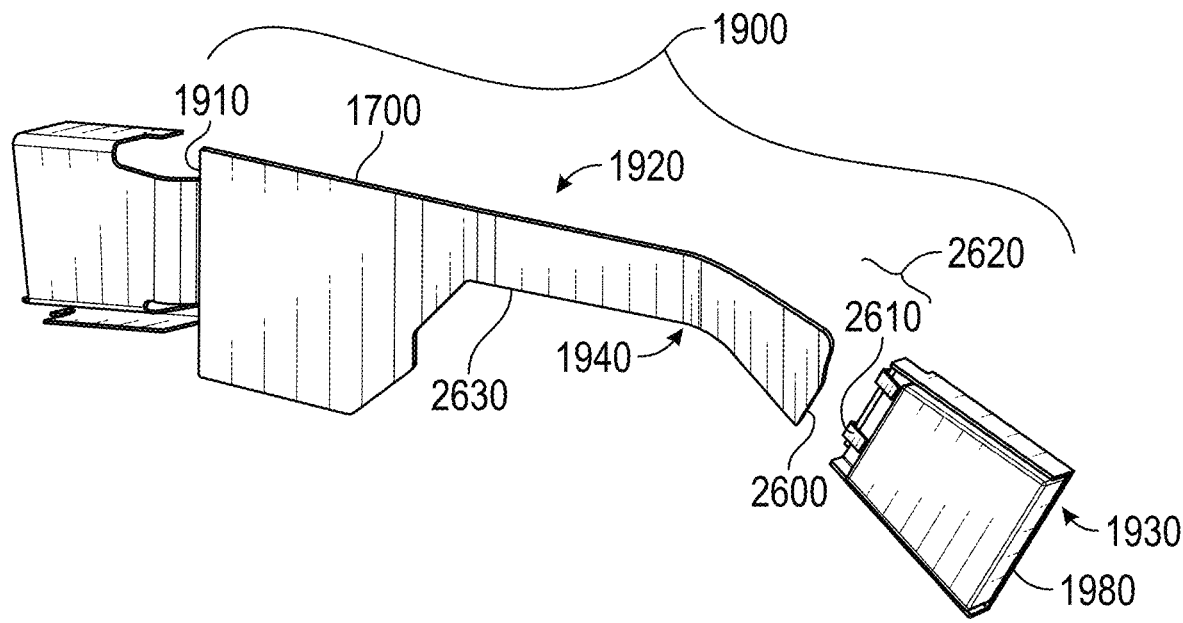
FIG. 26A illustrates a perspective view of another configuration of the thermal management device in accordance with an example.

FIG. 26A is a perspective view of another example of the wearable electronic eyewear device 100 showing the general spatial arrangement of the compartment 1910 including heat source 2000, thermal coupling 1920, and heat sink 1930. The heat source 2000 acquires heat from nearby onboard electrical components, such as a printed circuit board including a system on chip 1000 housed within the compartments 1910 on the respective hinged arms 125A-B. In this configuration, the thermal coupling 1920 has one or both of ends 2600 that extend towards heat sink 1930 past angled portion 1940 but does not contact heat sink end 2610, thereby producing a gap 2620 therebetween. Heat dissipates from the thermal coupling 1920 through the internal cavity of the hinged arm 125A-B to the heat sink 1930. In some examples, the gap 2620 is approximately $\frac{1}{20}$ to $\frac{1}{10}$ the overall distance between the respective ends of thermal management device 1900, and in one example, the gap 2620 is about $\frac{1}{18}$ the overall distance between the respective ends of thermal management device 1900. In this example, the thermal margin is increased by about 40%. In some examples, the thermal margin may be increased by between 35% and 45%. In other examples, the thermal margin is increased more than 45%. As shown, the thermal coupling 1920 has a substantially square area for compartment 1910 that tapers to a narrower rectangular portion 2630 that extends past angled portion 1940 before terminating at its distal end 2600.

Figure 26B:
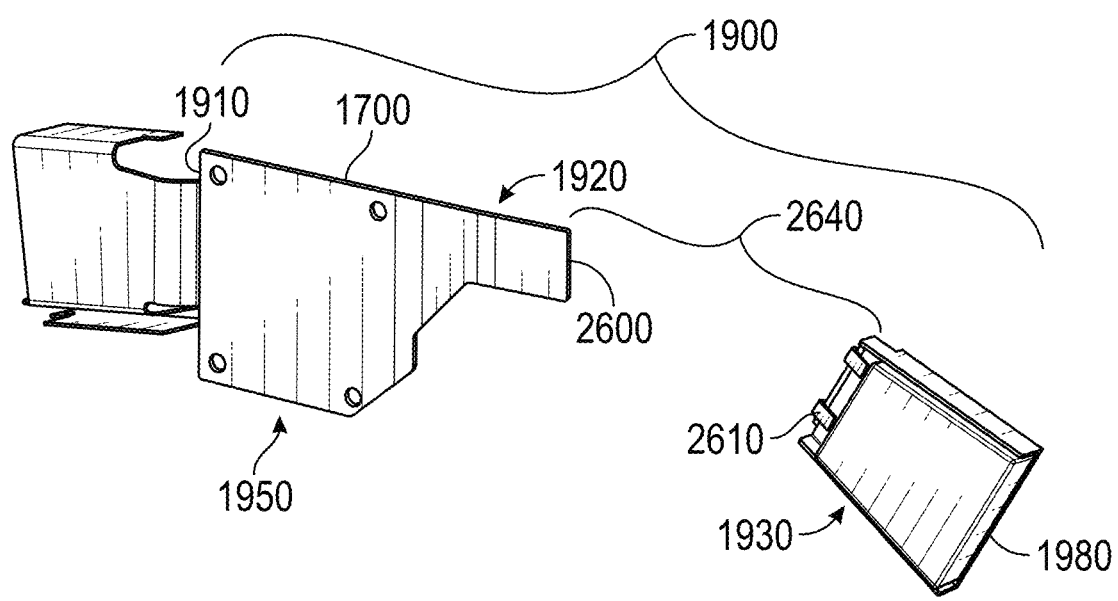
FIG. 26B illustrates a perspective view of another configuration of a thermal management device in accordance with an example.

FIG. 26B illustrates a perspective view of another configuration of the example shown in FIG. 26A. As illustrated, the thermal coupling 1920 extends towards heat sink 1930 but ends before reaching angled portion 1940, thereby producing a gap 2640 between thermal coupling end 2600 and heat sink end 2610 like the configuration shown in FIG. 26A but substantially wider. In one example, the gap 2640 is about ⅓ to ¼ the overall distance between the respective ends of thermal management device 1900.

It will be appreciated that the thermal management configuration described with respect to FIG. 10 coupled with the thermal management for the projector 150 described with respect to FIGS. 11-15, and the thermal management for the processing circuits described with respect to FIGS. 17-26 may be combined to significantly improve the thermal performance of the wearable electronic eyewear device 100. Further thermal improvements may be provided by separating the electronic components into the respective temples 110A-B and hinged arms 125A-B as described herein.

It will be further appreciated that the hinged arms 125A-B and the temples 110A-B may be combined whereby the arms 125A-B are not hinged but are an extended portion of the temples 110A-B. In this case, the air gap 1010 would not be at the hinge but would be at a position within the temple 110A-B separating the respective heat sinking assemblies for the projector 150 and the system on chip 1000 with associated electronics.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A wearable electronic eyewear device, comprising:
   a frame;
   at least one temple connected to the frame;
   at least one image display;
   at least one imaging device adapted to capture an image of a scene and to project the image to the at least one image display;
   at least one processing device; and
   a thermal management device comprising a first heat sink comprising a pair of thermally and physically isolated heat sinks disposed on opposite sides of and connected to the at least one imaging device and to the frame to sink heat from the at least one imaging device to the frame, a second heat sink thermally connected to the at least one processing device and the at least one temple to sink heat from the at least one processing device to the at least one temple, and a thermally insulating gap between the first heat sink and the second heat sink.

2. The eyewear device of claim 1, wherein the thermally insulating gap comprises an air gap.

3. The eyewear device of claim 1, comprising a first temple connected to a first end of the frame and a second temple connected to a second end of the frame, wherein the at least one processing device comprises a first co-processor located in the first temple and a second co-processor located in the second temple.

4. The eyewear device of claim 1, wherein the at least one imaging device comprises at least one projector comprising a green LED and a red/blue LED.

5. The eyewear device of claim 1, wherein a first of the pair of heat sinks is connected to the frame to sink heat to the frame and a second of the pair of heat sinks is connected to the at least one temple to sink heat to the at least one temple.

6. The eyewear device of claim 1, wherein the pair of heat sinks are comprised of a highly thermally conductive material and are physically and thermally separated from each other by a thermal interface material.

7. The eyewear device of claim 1, wherein the second sink comprises a vapor chamber having an evaporator side and a condensing side.

8. The eyewear device of claim 7, wherein the vapor chamber comprises a vacuum sealed enclosure, a wicking structure, and a working fluid that is absorbed by the wicking structure and transported to the evaporator side via capillary action.

9. The eyewear device of claim 8, wherein the vacuum sealed enclosure comprises top and bottom covers, the wicking structure comprises top and bottom wicking structures, further comprising copper pillars that separate the top and bottom wicking structures.

10. The eyewear device of claim 7, wherein the second heat sink further comprises a thermal coupling that connects the vapor chamber to a heat sink so as to thermally communicate heat from the vapor chamber to the heat sink.

11. The eyewear device of claim 10, wherein the vapor chamber, thermal coupling, and heat sink are disposed within the at least one temple.

12. The eyewear device of claim 11, wherein the at least one temple comprises a hinged arm and a hinge adjacent the frame, and the at least one processing device is located in the hinged arm.

13. The eyewear device of claim 12, wherein the thermal coupling extends through a substantial portion of the hinged arm from a portion adjacent the hinge to a portion of the hinged arm that would contact a user's ear when worn.

14. The eyewear device of claim 13, wherein the heat sink is located on an end of the hinged arm behind the user's ear when worn, and the thermal coupling extends from the vapor chamber to the heat sink.

15. The eyewear device of claim 10, wherein the thermal coupling comprises a thermal spreader in thermal communication with the vapor chamber.

16. The eyewear device of claim 15, wherein the thermal coupling further comprises a layer of thermal interface material interposed between the thermal spreader and the vapor chamber.

17. The eyewear device of claim 10, wherein the heat sink includes a battery and a battery shield.

18. A method of dissipating heat generated by at least one imaging device and at least one processing device of a wearable electronic eyewear device, comprising:
   providing a first heat sink thermally connecting the at least one imaging device to a frame of the wearable electronic eyewear device to sink heat from the at least one imaging device to the frame;
   providing a second heat sink thermally connecting the at least one processing device to at least one temple of the wearable electronic eyewear device to sink heat from the at least one processing device to the at least one temple, wherein the second sink comprises a vapor chamber having an evaporator side and a condensing side; and
   thermally insulating the first heat sink from the second heat sink.

19. The method of claim 18, further comprising disposing a first co-processor of the at least one processing device in a first temple connected to a first end of a frame of the wearable electronic eyewear device and disposing a second co-processor of the at least one processing device in a second temple connected to a second end of the frame of the wearable electronic eyewear device.

* * * * *